(12) United States Patent
Aminaka

(10) Patent No.: US 9,107,115 B2
(45) Date of Patent: Aug. 11, 2015

(54) HANDOVER CONTROL SYSTEM, TARGET CONTROL APPARATUS, SOURCE CONTROL APPARATUS, HANDOVER CONTROL METHOD, AND COMPUTER READABLE MEDIUM

(75) Inventor: Hiroaki Aminaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 699 days.

(21) Appl. No.: 13/389,579

(22) PCT Filed: Aug. 6, 2010

(86) PCT No.: PCT/JP2010/004974
§ 371 (c)(1),
(2), (4) Date: Feb. 8, 2012

(87) PCT Pub. No.: WO2011/018890
PCT Pub. Date: Feb. 17, 2011

(65) Prior Publication Data
US 2012/0142357 A1    Jun. 7, 2012

(30) Foreign Application Priority Data
Aug. 11, 2009 (JP) ................................. 2009-186394

(51) Int. Cl.
*H04W 36/00* (2009.01)

(52) U.S. Cl.
CPC .................................. *H04W 36/0055* (2013.01)

(58) Field of Classification Search
CPC .................................................... H04W 36/00
USPC .................................. 455/436, 437; 370/338
See application file for complete search history.

(56) References Cited

U.S. PATENT DOCUMENTS

| 6,400,951 | B1* | 6/2002 | Vaara | 455/436 |
| 2004/0120286 | A1* | 6/2004 | Schwarz | 370/331 |
| 2004/0202140 | A1* | 10/2004 | Kim et al. | 370/335 |
| 2005/0250498 | A1 | 11/2005 | Lim et al. | |
| 2007/0086388 | A1 | 4/2007 | Kang et al. | |
| 2007/0249347 | A1* | 10/2007 | Saifullah et al. | 455/436 |
| 2008/0014943 | A1* | 1/2008 | Ahn et al. | 455/436 |

(Continued)

FOREIGN PATENT DOCUMENTS

| CN | 1350758 A | 5/2002 |
| JP | 2007-116696 A | 5/2007 |

(Continued)

OTHER PUBLICATIONS

Communication dated Feb. 11, 2014, issued by the State Intellectual Property Office of the People's Republic of China in corresponding Application No. 201080035925.X.

(Continued)

*Primary Examiner* — Marcos Batista
(74) *Attorney, Agent, or Firm* — Sughrue Mion, PLLC

(57) ABSTRACT

A second control apparatus (1B) is configured to be able to investigate handover possibilities of a plurality of cells including cells (41 B, 42A, and 42C) in response to receipt of a handover request message transmitted from a first control apparatus (1A). The second control apparatus (1B) is configured to transmit an acknowledge response message indicating handover acknowledgment to the first control apparatus (1A) when at least one of the plurality of cells can accept a handover of a mobile station (3). As a result, extra signaling related to a handover procedure can be reduced.

34 Claims, 25 Drawing Sheets

(56) References Cited

U.S. PATENT DOCUMENTS

2009/0296659 A1 12/2009 Lim et al.
2009/0318155 A1* 12/2009 Fukuzawa et al. ............ 455/438

FOREIGN PATENT DOCUMENTS

| JP | 2007-536784 A | 12/2007 |
|----|---------------|---------|
| JP | 2010-4295 A | 1/2010 |
| WO | 2009/076208 A2 | 6/2009 |

OTHER PUBLICATIONS

3GPP TS 36.300, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2", (Release 8), (Jun. 2009), 5 pages, V8.9.0.

3GPP TS 36.413, "3rd Generation Partnership Project; Technical Specification Group Radio Access Network; Evolved Universal Terrestrial Radio Access Network (E-UTRAN); S1 Application Protocol (S1AP)", (Release 8), (Jun. 2009), pp. 1-218, V8.6.1.

3GPP TS 36.414, "3rd Generation Partnership Project; Technical Specification Group Radio Access Network Evolved Universal Terrestrial Radio Access Network (E-UTRAN); S1 data transport", (Release 8), (Mar. 2009), pp. 1-8, V8.4.0.

3GPP TS 36.423 "3rd Generation Partnership Project; Technical Specification Group Radio Access Network; Evolved Universal Terrestrial Radio Access Network (E-UTRAN); X2 application protocol (X2AP)", Release 8, (Jun. 2009), pp. 1-100, V8.6.0.

3GPP TS 36.424, "3rd Generation Partnership Project; Technical Specification Group Radio Access Network; Evolved Universal Terrestrial Access Network (E-UTRAN); X2 data transport", (Release 8), (Mar. 2009), pp. 1-8, V.8.5.0.

3GPP TSG-RAN WG2 #66bis, "Report of email discussion [66#22] on Relay architecture", Email Discussion Rapporteur (NTT DOCOMO, Inc.), Jun. 29-Jul. 3, 2009, 30 pages, R2-093972.

Notification of Reasons for Refusal, dated May 7, 2014, issued by the Japanese Patent Office, in counterpart Application No. 2011-526685.

* cited by examiner

HANDOVER CONTROL SYSTEM, TARGET CONTROL APPARATUS, SOURCE CONTROL APPARATUS, HANDOVER CONTROL METHOD, AND COMPUTER READABLE MEDIUM

CROSS REFERENCE TO RELATED APPLICATIONS

This application is a National Stage of International Application No. PCT/JP2010/004974, filed on Aug. 6, 2010, which claims priority from Japanese Patent Application No. 2009-186394 filed on Aug. 11, 2009, the contents of all of which are incorporated herein by reference in their entirety.

TECHNICAL FIELD

The present invention relates to a control for a handover of a mobile station.

BACKGROUND ART

In the LTE-Advanced (Long Term Evolution Advanced) study item of 3GPP (3rd Generation Partnership Project), introduction of a relay station (hereinafter RN: Relay Node) is under consideration. The RN is a technique for increasing the communication rate of a mobile station located at a cell edge (hereinafter UE: User Equipment) and for expanding the cell coverage of a base station (hereinafter eNB: Evolved Node B), for example.

In a network in which the RN is introduced, the base station (eNB: Evolved Node B) having a function of connecting with the RN is referred to as "Donor eNB (hereinafter DeNB)".

The term "DeNB" is herein used to be distinguished from the normal eNB in a description of events unique to the DeNB related to connection with the RN.

The mobile station (hereinafter UE: User Equipment) which is directly connected to the DeNB is herein referred to as "eNB-UE". In contrast, the mobile station which is directly connected to the RN is herein referred to as "RN-UE". In a description of events common to both the eNB-UE and the RN-UE is referred to simply as "UE".

In the discussion on the LTE-Advanced Study Item, there is a demand for supporting a multi-hop RN in the future. The multi-hop RN is a technique for connecting another RN in cascade with the RN connected to the DeNB. In the case of describing multi-hopping, the RN which is connected to a lower layer of the DeNB via a radio interface is herein referred to as "upper-level RN" and the RN which is connected to a lower layer of the upper-level RN via a radio interface is herein referred to as "lower-level RN" so as to make a distinction therebetween.

The radio interface between the DeNB and the RN and between the upper-level RN and the lower-level RN is referred to as "backhaul link". On the other hand, the radio interface between the eNB and the eNB-UE and between the RN and the RN-UE is referred to as "access link".

An outline of the RN under consideration in the LTE-Advanced study item of 3GPP will be described below. FIG. 1 is a diagram showing a network configuration example using the RN in LTE-Advanced. Base stations (eNBs) 8A and 8B are connected to a core network (CN) 5 of a mobile network operator. The CN 5 includes MME (Mobility Management Entity) and S-GW (Serving Gateway).

The base stations 8A and 8B generate cells 41A and 41B, respectively, and relay traffic between a mobile station (UE) 3 and the CN5. The base station 8B is connected to a relay station (RN) 9 via a backhaul link (BL1 in the figure). That is, the base station 8B corresponds to the above-mentioned DeNB. The relay station 9 is connected to the CN5 via the backhaul link (BL1) between the relay station 9 and the base station 8B. The relay station 9 generates a cell 42 and relays traffic between the mobile station 3 and the CN5.

In the LTE-Advanced study item, the following four alternatives for a network architecture using the RN are proposed (see 3GPP contribution R2-093972 (Non Patent Literature 1)).
1. Full-L3 relay, transparent for DeNB
2. Proxy S1/X2
3. RN bearers terminate in RN
4. S1 termination in DeNB These four RN network architecture alternatives can be classified into the following two groups in terms of the termination point of S1 application protocol (S1AP) used for an interface (S1) between a control apparatus (hereinafter MME/S-GW) within the core network and each eNB. As for the details of the S1 interface and the S1AP, see 3GPP technical specifications TS36.413 (Non Patent Literature 2) and TS36.414 (Non Patent Literature 3).

Group I: S1 protocol is terminated at the DeNB (Alternatives 2 and 4)
Group II: S1 protocol is terminated at the RN (Alternatives 1 and 3)

Next, an outline of a handover procedure of a mobile station in LTE-Advanced will be described. A handover in LTE-Advanced includes two procedures: an X2 handover and an S1 handover.

In the X2 handover, a handover is performed using an X2 interface which is an inter-eNB interface. In other words, the X2 interface is used for signaling related to a handover between a source eNB (S-eNB) and a target eNB (T-eNB) and for transfer of user data. As for details of the X2 interface and X2AP, see 3GPP technical specifications TS36.423 (Non Patent Literature 4) and TS36.424 (Non Patent Literature 5).

On the other hand, in the S1 handover, an S1 interface is used for a handover from the S-eNB to the T-eNB. The S1 handover is executed in the case where the X2 interface cannot be used between the S-eNB and the T-eNB, or in the case of performing an inter-MME handover, for example.

FIG. 2A shows a successful example of the X2 handover procedure. The S-eNB (base station 8A shown in FIG. 1) receives a measurement report from the UE (mobile station 3 shown in FIG. 1) (step S101). The measurement report includes a measurement result of a reception quality of a radio signal from a neighboring cell of the cell 41A to which the UE (mobile station) belongs. The S-eNB (base station 8A) decides an optimum handover destination cell based on the measurement report. The S-eNB (base station 8A) transmits a handover request message (Handover Request) including information on the handover destination cell to the T-eNB (base station 8B) via the X2 interface (step S102).

When the handover is acceptable, the T-eNB (base station 8B) transmits, to the S-eNB (base station 8A) via the X2 interface, an acknowledge response message (Handover Request Acknowledge) including information necessary for the handover (e.g. configuration information on an access link) (step S103). The S-eNB (base station 8A) having received the acknowledge response transmits, to the UE (mobile station 3), a message (RRC Connection Reconfiguration) prompting to change an RRC connection destination. Then, the UE (mobile station 3) transmits a random access preamble to the T-eNB (base station 8B), thereby starting an RRC connection with the T-eNB (base station 8B) (step S105).

FIG. 2B shows a successful example of the S1 handover procedure. The S-eNB (base station 8A) receives a measurement report from the UE (mobile station 3) (step S111). The S-eNB (base station 8A) determines an optimum handover destination cell based on the measurement report. The S-eNB (base station 8A) transmits, to the MME via the S1 interface, a handover request message (Handover Required) including information on the handover destination cell (step S112). The MME having received the Handover Required message transmits a handover request message (Handover Request) to the T-eNB (base station 8B) (step S113). When the handover is acceptable, the T-eNB (base station 8B) transmits the acknowledge response message (Handover Request Acknowledge) to the MME via the S1 interface (step S114). In step S115, the MME transmits, to the S-eNB (base station 8A), a message (Handover Command) indicating acknowledgement of the handover. The subsequent steps S116 and S118 are similar to steps S104 and S105 of FIG. 2A.

CITATION LIST

Non Patent Literature

[Non Patent Literature 1] 3GPP contribution, R2-093972 "Report of email discussion [66#22] on Relay architecture", [online], 3GPP, [retrieved on Jul. 22, 2009], Internet <URL: ftp://ftp.3gpp.org/tsg_ran/WG2_RL2/TSGR2_66bis/Docs/R2-093972.zip>
[Non Patent Literature 2] 3GPP TS36.413 v8.6.1 (2009 June), "S1 Application Protocol (S1AP)"
[Non Patent Literature 3] 3GPP TS36.414 v8.4.0 (2009 March), "S1 data transport"
[Non Patent Literature 4] 3GPP TS36.423 v8.6.0 (2009 June), "X2 Application Protocol (X2AP)"
[Non Patent Literature 5] 3GPP TS36.424 v8.5.0 (2009 March), "X2 data transport"

SUMMARY OF INVENTION

Technical Problem

Next, an X2 handover procedure and an S1 handover procedure which are assumed when the RN is used will be described with reference to FIGS. 3A and 3B. FIG. 3A is sequence diagram showing the X2 handover procedure, and FIG. 3B shows a sequence diagram showing the S1 handover procedure. Please note that FIGS. 3A and 3B were prepared by the inventor of the present invention with regard to the above-mentioned network architecture in Group 1 in which the S1 protocol is terminated at the DeNB. Accordingly, FIGS. 3A and 3B do not illustrate any publicly-known technique.

FIG. 3A shows a successful example of the X2 handover from the eNB (base station 8A) to the RN (relay station 9). Steps S101 and S102 are similar to those of FIG. 2A. When the handover destination is the relay station 9, however, the S-eNB (base station 8A) transmits a handover request message (Handover Request) to the DeNB (base station 8B) to which the relay station 9 is connected. The handover destination designated in the handover request message (Handover Request) in S102 is the relay station 9.

Upon receiving the handover request message designating the RN as the handover destination, the DeNB (base station 8B) transfers the handover request message to the target RN (T-RN), that is, the relay station 9 in this case (step S201). When the handover is acceptable, the T-RN (relay station 9) transmits an acknowledge response message (Handover Request Acknowledge) including information necessary for the handover (e.g. configuration information on an access link) to the DeNB (base station 8B) (step S202). The subsequent steps S103 to S105 are similar to those of FIG. 2A.

FIG. 3B shows a successful example of the S1 handover from the eNB (base station 8A) to the RN (relay station 9). Also in this case, the DeNB (base station 8B) relays the handover request message from the MME to the T-RN (relay station 9) and the acknowledge response message from the T-RN (relay station 9) to the MME (steps S201 and S202). The other steps shown in FIG. 3B are similar to those shown in FIG. 2B.

As described above, the handover request from the S-eNB includes designation of a single handover destination. When the handover request is not acceptable because the resource of the T-eNB or T-RN is insufficient, for example, the T-eNB or T-RN transmits a handover reject response message (Handover Preparation Failure) to the S-eNB. Then, the S-eNB having received the handover reject response message decides a next handover destination and transmits a new handover request message to this next handover destination. FIGS. 4 and 5 are sequence diagrams each showing repetition of the handover procedure by the S-eNB.

FIG. 4 shows an inter-eNB X2 handover. In step S301, the UE transmits a measurement report to the S-eNB. Steps S302 and S303 indicate a handover procedure for a first handover destination candidate cell (T-eNB1). As shown in step S303, when the T-eNB1 transmits a handover reject response (Handover Preparation Failure), the S-eNB starts the handover procedure to next handover destination candidate cell (T-eNB2) (steps S304 and S305). Upon receiving the acknowledge response message (Handover Request Acknowledge) from the T-eNB2, the S-eNB transmits an RRC connection reconfiguration message to the UE (step S306). If the T-eNB2 also transmits the handover reject response, the S-eNB starts the handover procedure to the further next handover destination candidate cell. The S-eNB repeats this operation until there is no handover destination candidate.

FIG. 5 shows an X2 handover between the eNB and the RN. In step S311, the UE transmits a measurement report to the S-eNB. Steps S312 to S315 indicate a handover procedure to a first handover destination candidate cell (T-RN1). As shown in step S314, when the T-RN1 transmits the handover reject response (Handover Preparation Failure), the S-eNB starts the handover procedure to next handover destination candidate cell (T-RN2) (steps S316 to S319). Upon receiving the acknowledge response message (Handover Request Acknowledge) from the T-RN2, the S-eNB transmits an RRC Connection Reconfiguration message to the UE (step S320).

As described above, in the handover in LTE-advanced, the S-eNB transmits the handover request including designation of a single handover destination. Upon receiving the reject response message, the S-eNB decides the next handover destination cell and retransmits the handover request. In other words, signaling related to the handover is concentrated on the S-eNB and is sequentially executed for each handover destination starting from the S-eNB. Accordingly, if the handover procedure for the first candidate has failed, there is a problem that extra signaling is generated. The extra signaling causes an increase in time required for completion of the handover, which leads to a handover failure due to out-of-synchronization of a mobile station.

This problem becomes remarkable particularly when the RN is used. This is because the DeNB intervenes in signaling. However, the problem of extra signaling occurs also in the case of using no RN as shown in FIG. 4. Furthermore, the problem of extra signaling occurs not only in LTE-Advanced but also in other mobile communication systems such as UTRAN (UMTS (Universal Mobile Telecommunications System) Terrestrial Radio Access Network), LTE/E-TRAN (Evolved UTRAN), and GSM (Global System for Mobile Communications). Also in such other mobile communication systems, signaling related to a handover is concentrated on a cell control entity (hereinafter referred to as "source control apparatus") of a handover source cell. Examples of the source control apparatus include an RNC (Radio Network Controller) in the UTRAN and an eNB in the E-UTRAN.

The present invention has been made in view of the above-mentioned problems, and has an object to provide a handover control system, a handover control apparatus, a handover control method, and a program, which contribute to a reduction in extra signaling related to a handover procedure.

Solution to Problem

A handover control system according to a first exemplary aspect of the present invention includes a first control apparatus and a second control apparatus. The first control apparatus is configured to transmit a first request message including first cell information designating a target cell as a handover destination of a mobile station. The second control apparatus is configured to be able to transmit, to the first control apparatus, a first acknowledge response message including second cell information designating another cell that can accept a handover and that is different from the target cell.

A handover control system according to a second exemplary aspect of the present invention includes a first control apparatus and a second control apparatus. The first control apparatus is configured to transmit a first request message including first cell information designating a plurality of cells related to a handover destination of a mobile station. The second control apparatus is configured to be able to transmit, to the first control apparatus, a first acknowledge response message including second cell information on at least one cell that can accept a handover among the plurality of cells.

A target control apparatus according to a third exemplary aspect of the present invention includes a control unit. The control unit is configured to be able to receive a first request message including first cell information designating a target cell as a handover destination of a mobile station, and to transmit a first acknowledge response message including second cell information designating another cell that can accept a handover and that is different from the target cell.

A source control apparatus according to a fourth exemplary aspect of the present invention includes a control unit. The control unit transmits a first request message including first cell information designating a plurality of cells related to a handover destination of a mobile station, and controls a handover of the mobile station based on a reception result of a first acknowledge response message including second cell information on at least one cell that can accept the handover among the plurality of cells.

A handover control method according to a fifth exemplary aspect of the present invention includes: (a) receiving a first request message including first cell information designating a target cell as a handover designation of a mobile station; and (b) transmitting a first acknowledge response message including second cell information designating another cell that can accept a handover and that is different from the target cell.

A handover control method according to a sixth exemplary aspect of the present invention includes: (a) transmitting a first request message including first cell information designating a plurality of cells related to a handover destination of a mobile station; and (b) controlling a handover of the mobile station based on a reception result of a first acknowledge response message including second cell information on at least one cell that can accept the handover among the plurality of cells.

A seventh exemplary aspect of the present invention is a non-transitory computer readable medium storing a program that causes a computer to execute the handover control according to the fifth exemplary aspect described above.

An eighth exemplary aspect of the present invention is a non-transitory computer readable medium storing a program that causes a computer to execute the handover control according to the sixth exemplary aspect described above.

Advantageous Effects of Invention

According to the above-mentioned exemplary aspects of the present invention, it is possible to provide a handover control system, a target control apparatus, a source control apparatus, a handover control method, and a program, which contribute to a reduction in extra signaling related to a handover procedure.

DESCRIPTION OF EMBODIMENTS

Figure 1:
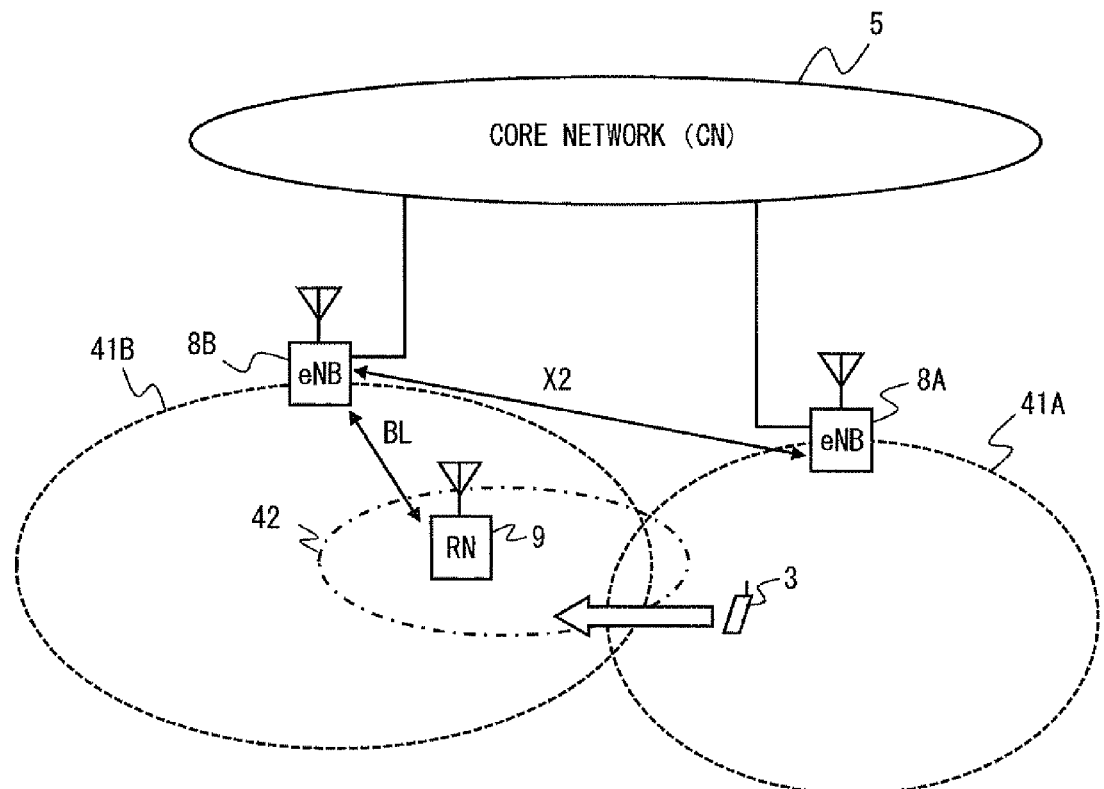
FIG. 1 is a diagram showing a network configuration example using RNs in LTE-Advanced.
Figure 2A:
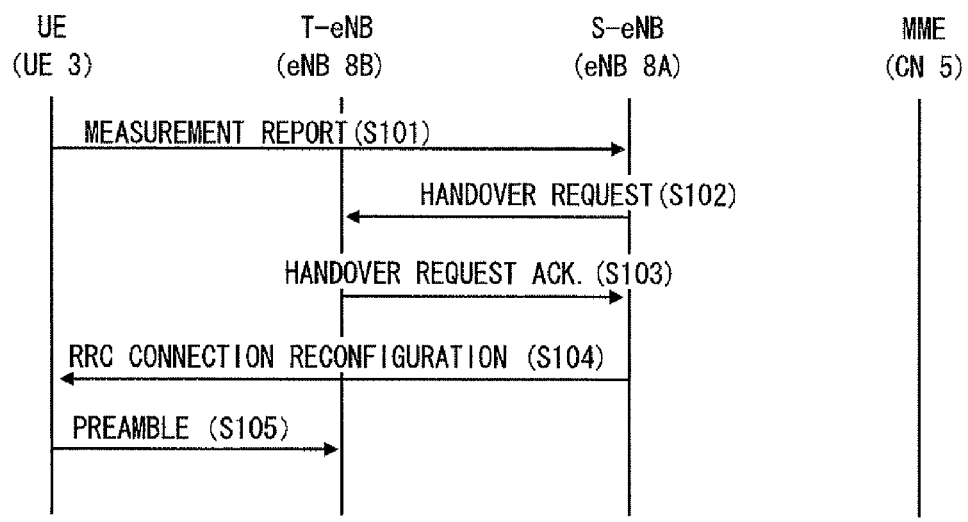
FIG. 2A is a sequence diagram showing an X2 handover procedure in LTE-Advanced.
Figure 2B:
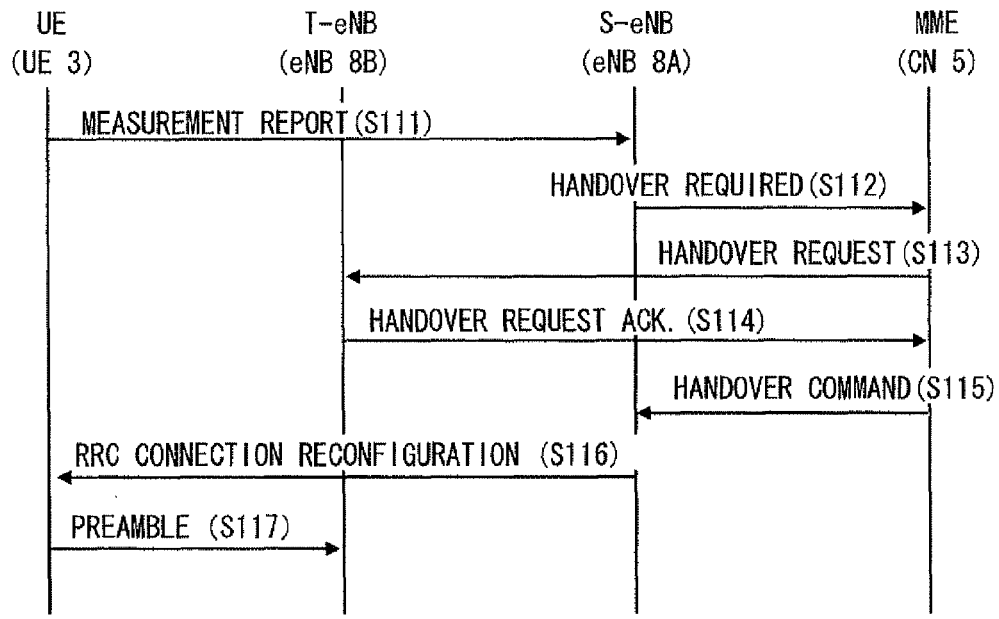
FIG. 2B is a sequence diagram showing an S1 handover procedure in LTE-Advanced.
Figure 3A:
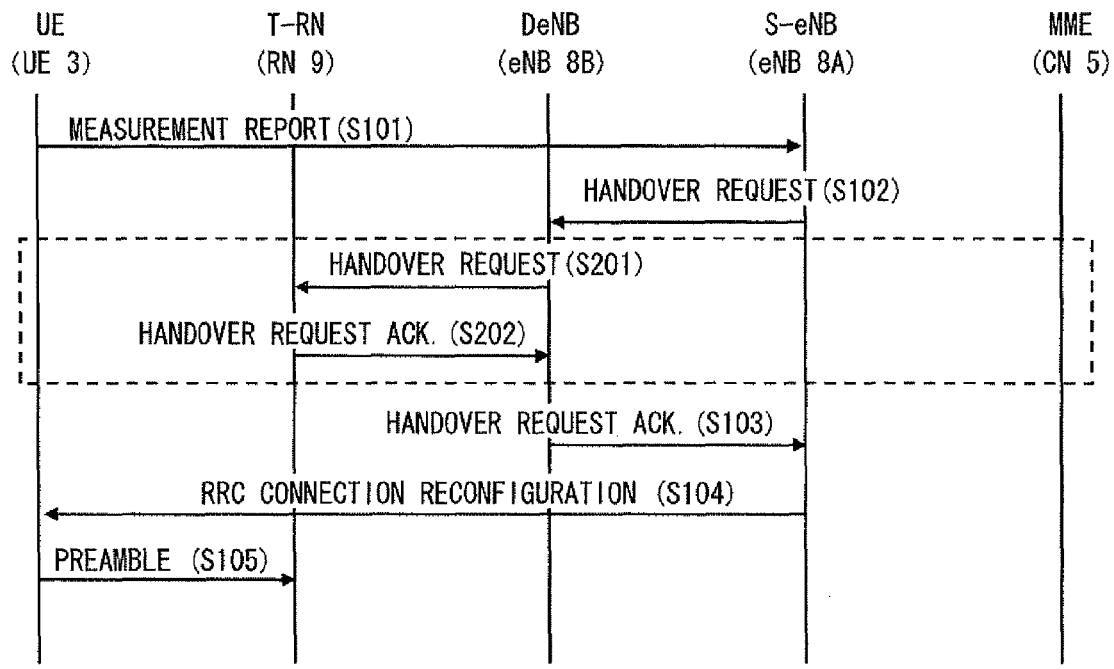
FIG. 3A is a sequence diagram showing an X2 handover procedure using RNs in LTE-Advanced.
Figure 3B:
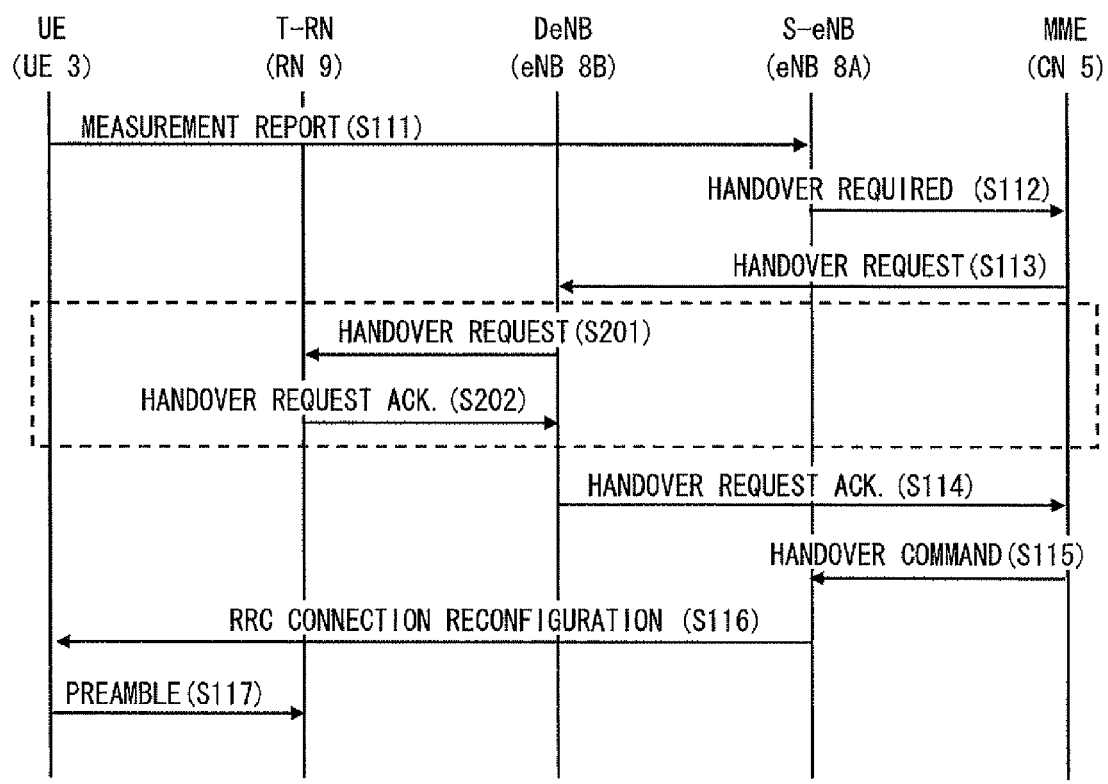
FIG. 3B is a sequence diagram showing an S1 handover procedure using RNs in LTE-Advanced.
Figure 4:
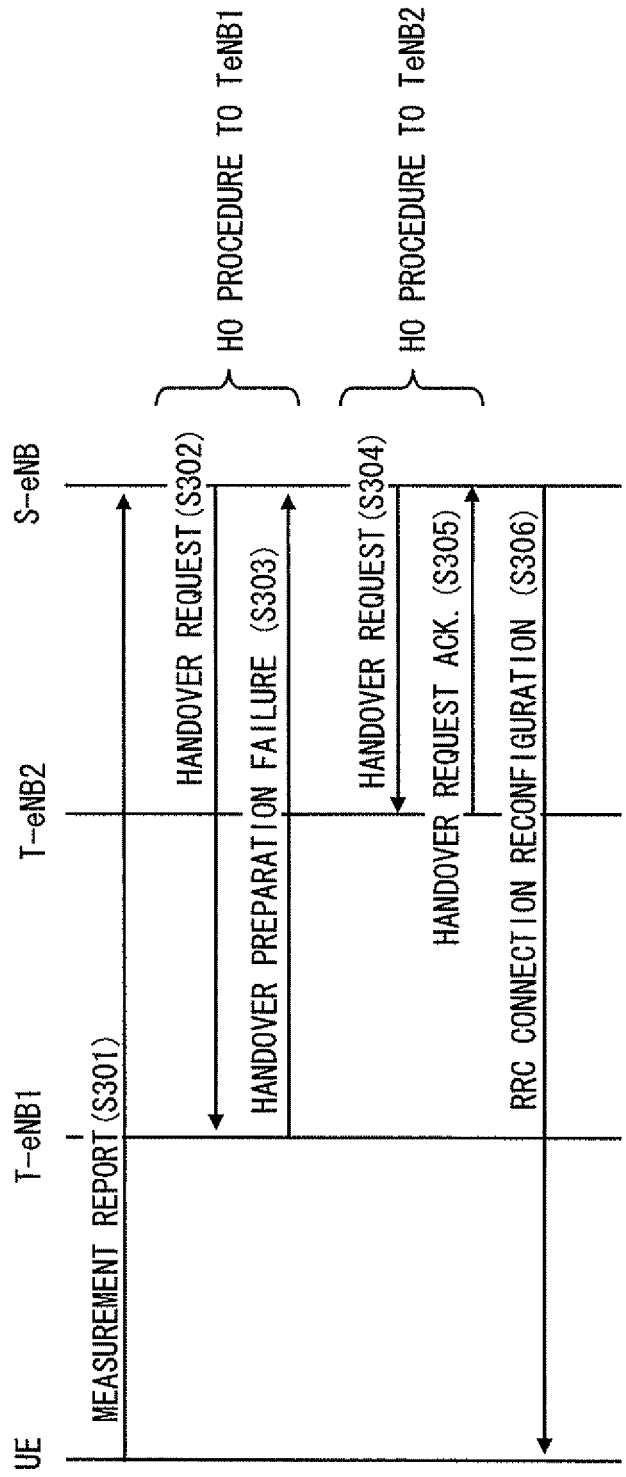
FIG. 4 is a sequence diagram showing repetition of a handover procedure in LTE-Advanced.
Figure 5:
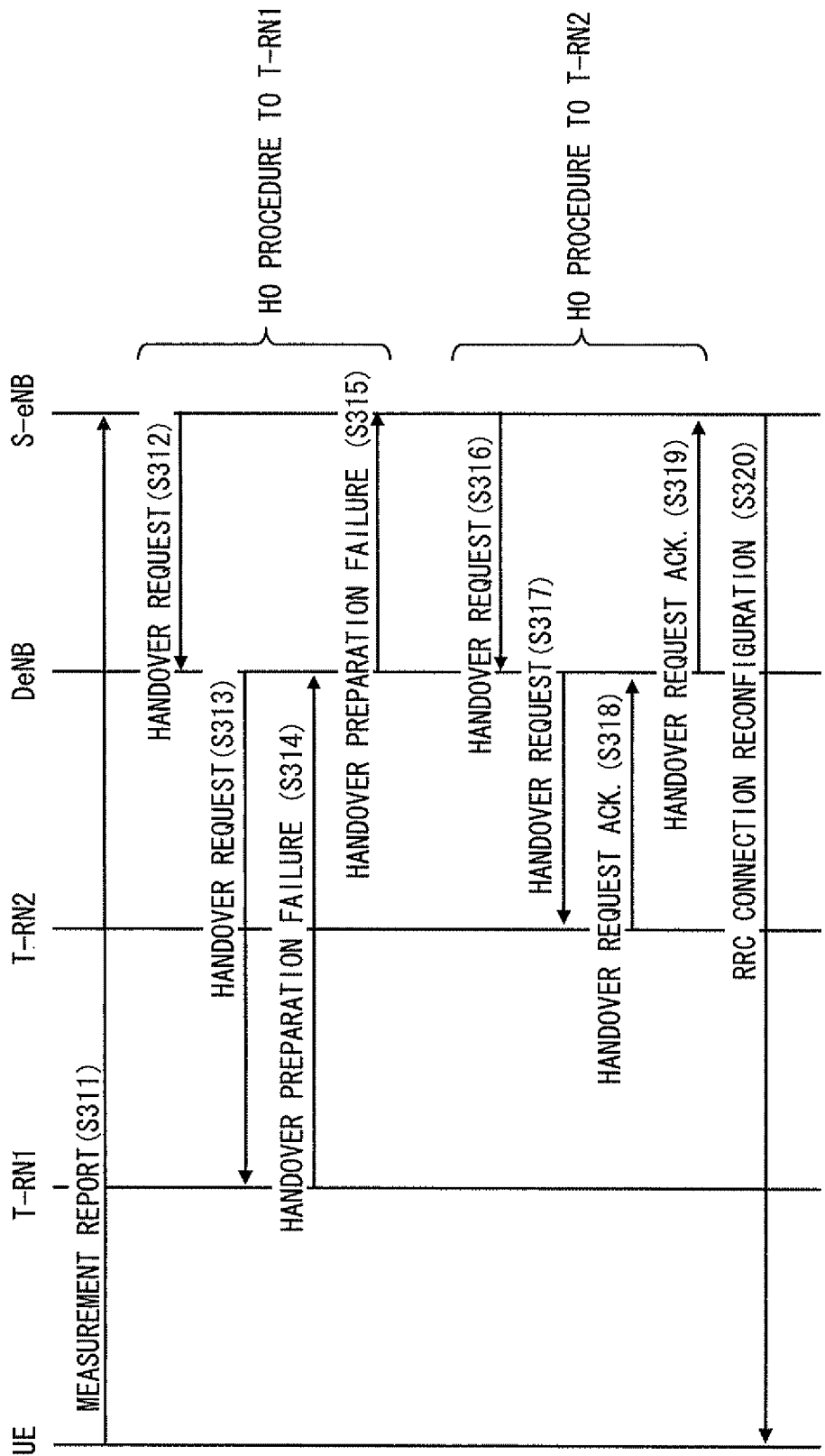
FIG. 5 is a sequence diagram showing repetition of a handover procedure using RNs in LTE-Advanced.

Hereinafter, exemplary embodiments of the present invention will be described in detail with reference to the drawings. In the drawings, the same components are denoted by the same reference numerals, and a redundant explanation thereof is omitted as necessary for clarity of explanation.
<First Exemplary Embodiment>

In this exemplary embodiment, a target control apparatus, such as T-RNC. T-eNB, or DeNB, which is related to a handover destination cell (target cell), can investigate handover possibilities of a plurality of cells in response to receipt of a handover request. When at least one of the plurality of cells can accept a handover of the mobile station, the target control apparatus is able to transmit a handover acknowledge response message to a control apparatus (S-RNC, S-eNB, S-RN, etc.) on the side of a source cell. In other words, the target control apparatus of this exemplary embodiment is able to autonomously investigate handover possibilities on behalf of a source control apparatus, and is able to notify the source control apparatus of a cell that can accept the handover.

More specifically, when the target cell (T-RN, etc.) designated in the handover request cannot accept the handover request, the target control apparatus of this exemplary embodiment investigates handover possibilities of other cell. This investigation can be performed by transmitting the handover request to RN, eNB, or the like which manages the other cell. Alternatively, the investigation can be performed by monitoring a use status of a radio resource of its own cell managed by the target control apparatus. When the handover destination cell designated in the handover request cannot accept the handover and when another cell that can be investigated by the target control apparatus can accept the handover, the target control apparatus transmits an acknowledge response message including information on the another cell.

A configuration and operation of a handover control system according to this exemplary embodiment will be described in detail below. In the following description, a case of using RNs in an LTE-Advanced system will be described by way of example.

Figure 6:
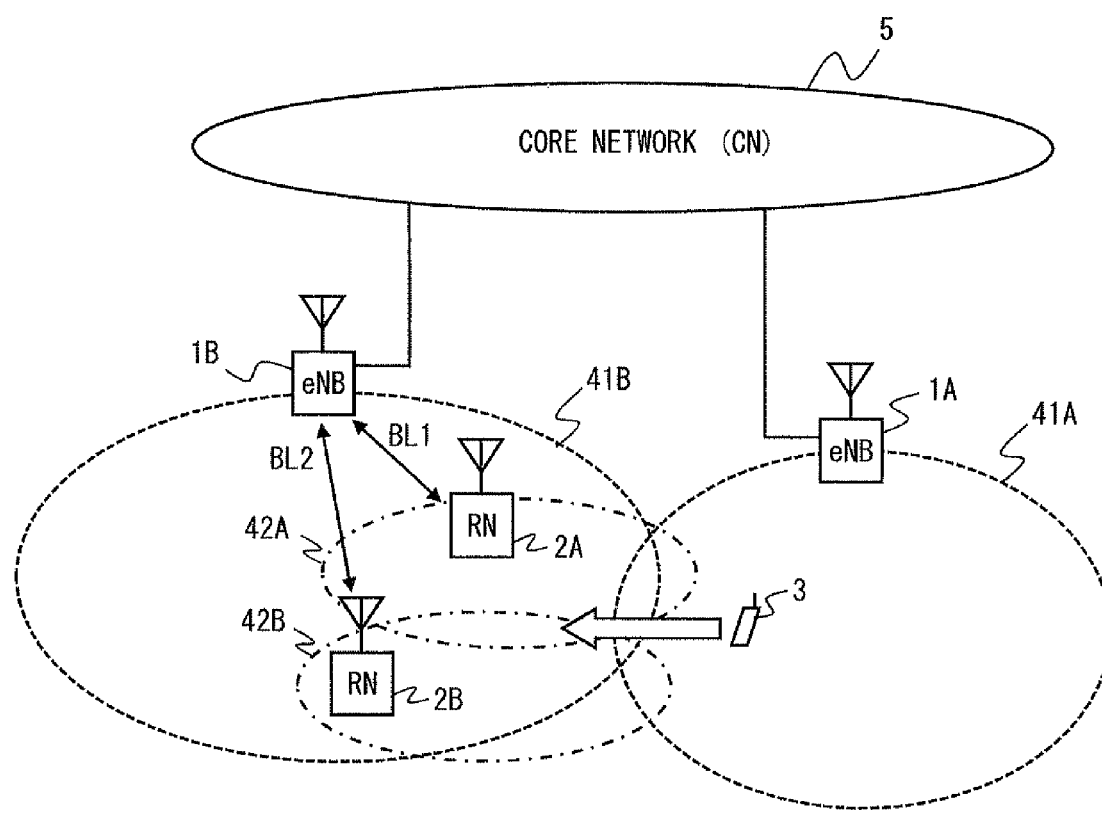
FIG. 6 is a block diagram showing a configuration example of a handover control system according to first to third exemplary embodiments of the invention.

FIG. 6 is a diagram showing a configuration example of a mobile communication system including the handover control system. The handover control system of this exemplary embodiment includes a base station (eNB) 1A serving as the source control apparatus, a base station (eNB) 1B serving as the target control apparatus, and relay stations (RNs) 2A and 2B. The base stations 1A and 1B generate cells 41A and 41B, respectively, and relay traffic between a mobile station (UE) 3 and CN5. The base station 1B is connected to the relay stations (RNs) 2A and 2B via backhaul links (BL1 and BL2 in the figure). That is, the base station 1B corresponds to DeNB described above. The relay stations 2A and 2B generate cells 42A and 42B, respectively, and relay traffic between the mobile station 3 and the CN5. Although only one mobile station is illustrated in FIG. 6, the base stations 1A and 1B and the relay stations 2A and 2B may be connected with a plurality of mobile stations 30.

Figure 7:
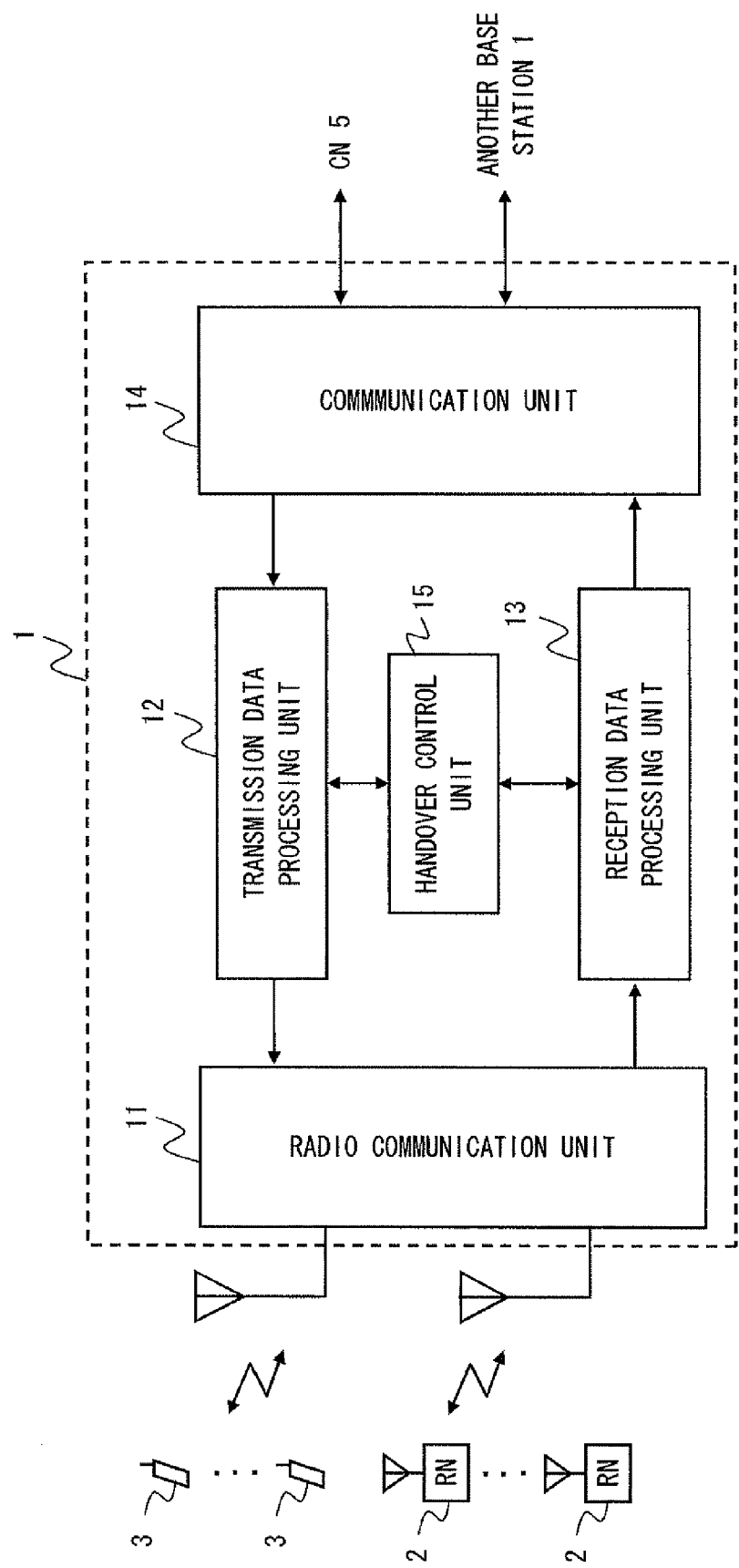
FIG. 7 is a block diagram showing a configuration example of a base station 1.

Next, configuration examples of the base station 1 (including 1A and 1B) and the relay station 2 (including 2A and 2B) will be sequentially described. FIG. 7 is a block diagram showing a configuration example of the base station 1. In FIG. 7, a radio communication unit 11 receives an uplink signal, which has been transmitted from the mobile station 30 or the relay station 2, via an antenna. A reception data processing unit 13 performs various processes such as inverse spreading of the received uplink signal, RAKE combining, deinterleaving, channel decoding, and error correction to reconstruct the reception data. The obtained reception data is transferred to the CN 5 via a communication unit 14.

A transmission data processing unit 12 generates a transport channel by performing error correction encoding, rate matching, interleaving, and the like on the data which has been acquired from the communication unit 14 and which is to be transmitted toward the mobile station 3 or the relay station 2. Further, the transmission data processing unit 12 generates a radio frame by adding control information to data series of the transport channel. Furthermore, the transmission data processing unit 12 generates a transmission symbol stream by performing spreading processing and symbol mapping. The radio communication unit 11 generates a downlink signal by performing various processes such as quadrature modulation, frequency conversion, and signal amplification on the transmission symbol stream, and transmits the downlink signal to the mobile station 3 or the relay station 2.

A handover control unit 15 performs signaling among the mobile station 3, another base station 1, and the CN5, thereby controlling the handover of the mobile station 3. A case where the base station 1 serves as the S-eNB and a case where the base station 1 serves as the T-eNB will be separately described in detail below.
<1. A Case where the Base Station 1 Serves as S-eNB>

The handover control unit 15 receives a measurement report, which has been notified from the mobile station 3, via the reception data processing unit 13. The handover control unit 15 decides the handover destination based on radio quality information included in the measurement report. The handover control unit 15 transmits a handover request message to another base station 1 via the communication unit 14, or to the relay station 2 via the radio communication unit 11. Further, the handover control unit 15 starts the handover of the mobile station 3 based on contents of a response message corresponding to the handover request.

<2. A Case where the Base Station 1 Serves as T-eNB>

The handover control unit 15 receives a handover request transmitted from the base station 1 or the relay station 2 via the communication unit 14 or the radio communication unit 11. When the handover is acceptable, the handover control unit 15 transmits an acknowledge response message including handover information on its own cell to the base station 1 or the relay station 2 on the source cell side. When the handover request is not acceptable, the handover control unit 15 investigates whether or not an adjacent cell can accept the handover, and transmits an acknowledge response message including handover information on the adjacent cell that can accept the handover. If there is no adjacent cell that can accept the handover, the handover control unit 15 transmits the handover reject response (Handover Preparation Failure) to the base station 1 or the relay station 2 on the source cell side.

<3. A Case where the Base Station 1 Serves as DeNB that Mediates T-RN>

The handover control unit 15 receives a handover request transmitted from the base station 1 or the relay station 2 via the communication unit 14 or the radio communication unit 11. When RN is designated as the handover destination in the handover request, the handover control unit 15 transfers a handover request message to the T-RN so as to investigate whether or not the target RN (T-RN) can accept the handover. Upon receiving a handover acknowledge response from the T-RN, the handover control unit 15 transmits an acknowledge response message including handover information on the T-RN to the base station 1 or the relay station 2 on the source cell side. On the other hand, upon receiving a handover reject response from the T-RN, the handover control unit 15 investigates whether or not an adjacent cell can accept the handover. This investigation may be performed based on its own resource management when the adjacent cell is its own cell. On the other hand, when the adjacent cell is a cell generated by another base station or relay station, the handover control unit 15 may transmit a handover request to the base station or the relay station of the adjacent cell, and may investigate whether the handover is acceptable or not depending on whether the response to the request is an acknowledge response or a reject response.

When there is an adjacent cell that can accept the handover, the handover control unit 15 transmits the acknowledge response message including information on the adjacent cell. When there is no adjacent cell that can accept the handover, the handover control unit 15 transmits the handover reject response to the base station 1 or the relay station 2 on the source cell side.

Figure 8:
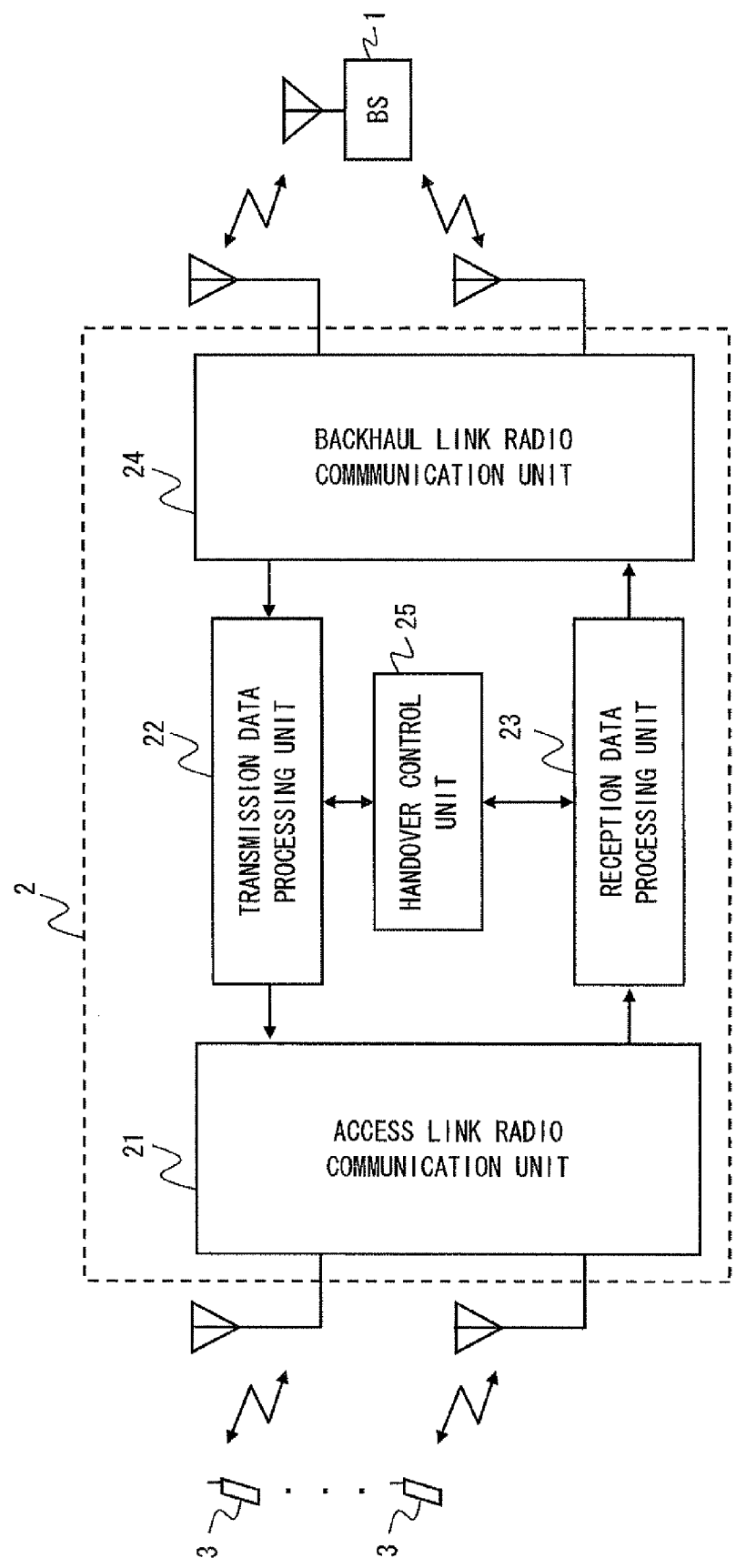
FIG. 8 is a block diagram showing a configuration example of a relay station 2.

FIG. 8 is a block diagram showing a configuration example of the relay station 2. Unless explicitly specified otherwise, the relay station 2 has functions similar to those of the base station 1. In FIG. 8, an access link radio communication unit 21 receives an uplink signal, which has been transmitted from the mobile station 3, via an antenna. A reception data processing unit 23 has functions similar to those of the reception data processing unit 13 of the base station 1, and the obtained reception data is transmitted to the base station 1 (DeNB) via a backhaul link radio communication unit 24. A transmission data processing unit 22 has functions similar to those of the transmission data processing unit 12 of the base station 1 and a buffer 121, and generates a transmission symbol stream from the transmission data which has been acquired from the backhaul link radio communication unit 24 and which is to be transmitted toward the mobile station 3. The radio communication unit 21 generates a downlink signal from the symbol stream, and transmits the downlink signal to the mobile station 3.

A handover control unit 25 performs signaling among the mobile station 3, the base station 1 (DeNB), and the CN5, thereby controlling a handover from the cell 42 to an adjacent cell and a handover from an adjacent cell to the cell 42. A case where the relay station 2 serves as the S-RN and a case where the relay station 2 serves as the T-RN will be separately described in detail below.

<1. A Case where the Relay Station 2 Serves as S-RN>

The handover control unit 25 receives a measurement report, which has been notified from the mobile station 3, via the reception data processing unit 23. The handover control unit 25 decides the handover destination based on radio quality information included in the measurement report. The handover control unit 25 transmits a handover request message to the base station 1 via the backhaul link radio communication unit 24, or to the relay station 2 via the access link radio communication unit 21. Further, the handover control unit 25 starts the handover of the mobile station 3 based on contents of a response message corresponding to the handover request.

<2. A Case where the Relay Station 2 Serves as T-RN>

The handover control unit 25 receives a handover request transmitted from the base station 1 or the relay station 2 via the radio communication unit 21 or 24. When the handover is acceptable, the handover control unit 25 transmits an acknowledge response message including handover information on its own cell to the base station 1 or the relay station 2 on the source cell side. When the handover request is not acceptable, the handover control unit 25 transmits a handover reject response (Handover Preparation Failure) to the base station 1 or the relay station 2 on the source cell side.

Figure 9:
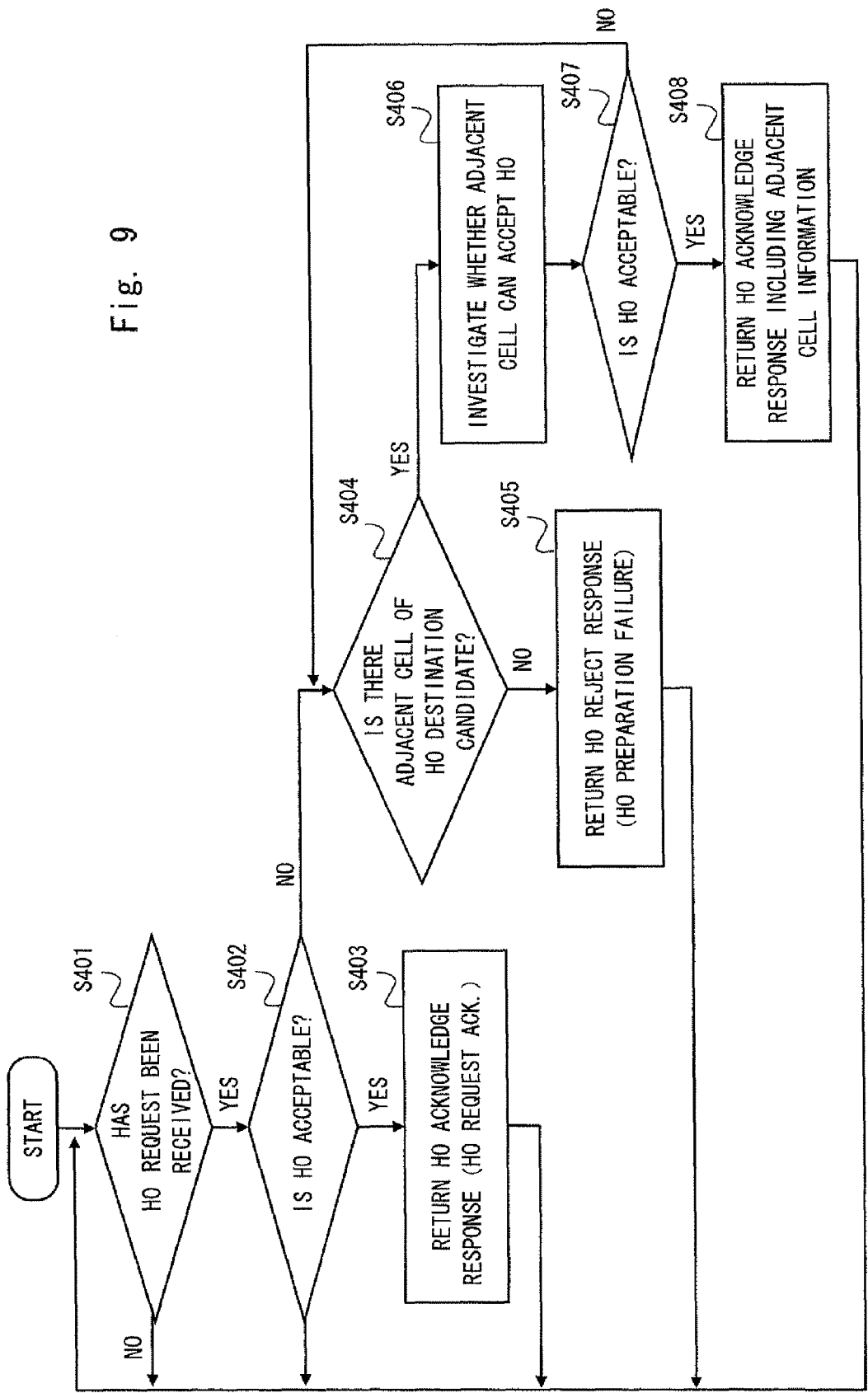
FIG. 9 is a flowchart showing a handover control procedure of the base station 1 in the first exemplary embodiment of the invention.

Specific examples of control operations of the handover control unit 15 of the base station 1 and the handover control unit 25 of the relay station 2 will be described below. FIG. 9 shows a specific example of an operation in a case where the base station 1B receives a handover request as the T-eNB or the DeNB that mediates the T-RN.

In step S401, the handover control unit 15 determines whether or not the handover request has been received from the source control apparatus (base station 1A) or the CN5. When the handover request has been received (YES in step S401), the handover control unit 15 investigates whether the target cell designated in the handover request can accept the handover. The investigation may be performed based on the own resource management when the target cell is its own cell. On the other hand, when the target cell is a cell generated by the relay station 2, the handover control unit 15 may transfer the handover request to the relay station 2, and may investigate whether the handover can be accepted or not depending on whether the response to the request is an acknowledge response or a reject response. The handover control unit 15 may regularly collect information as to whether neighboring cells can accept the handover, or load information of neighboring cells. In this case, the handover control unit 15 may determine whether the target cell can accept the handover, based on the information as to whether neighboring cells can accept the handover, or the load information of neighboring cells, which is collected in advance.

When the target cell can accept the handover (YES in step S402), the control unit 15 returns a handover acknowledge response including the handover information on the target cell (step S403).

On the other hand, when the target cell cannot accept the handover (i.e. cannot accept the handover request) (NO in step S402), the control unit 15 determines whether there is a cell adjacent to the target cell (i.e. handover destination candidate cell) (step S404). When there is no adjacent cell (NO in step S404), the control unit 15 returns the handover reject response (step S405). When there is an adjacent cell (YES in step S404), the control unit 15 investigates whether or not the adjacent cell can accept the handover (step S406). The investigation may be performed based on its own resource management when the adjacent cell is its own cell. On the other hand, when the adjacent cell is a cell generated by another base station 1 or the relay station 2, the control unit 15 may newly generate and transmit a handover request, and may perform investigation depending on whether the response to the request is an acknowledge response or a reject response.

When determining that the adjacent cell can accept the handover as a result of the investigation in step S406 (YES in step S407), the control unit 15 returns the handover acknowledge response including handover information on the adjacent cell (step S408). When the adjacent cell cannot accept the handover, the control unit 15 returns to step S404 and repeats a similar procedure for another adjacent cell.

Figure 10:
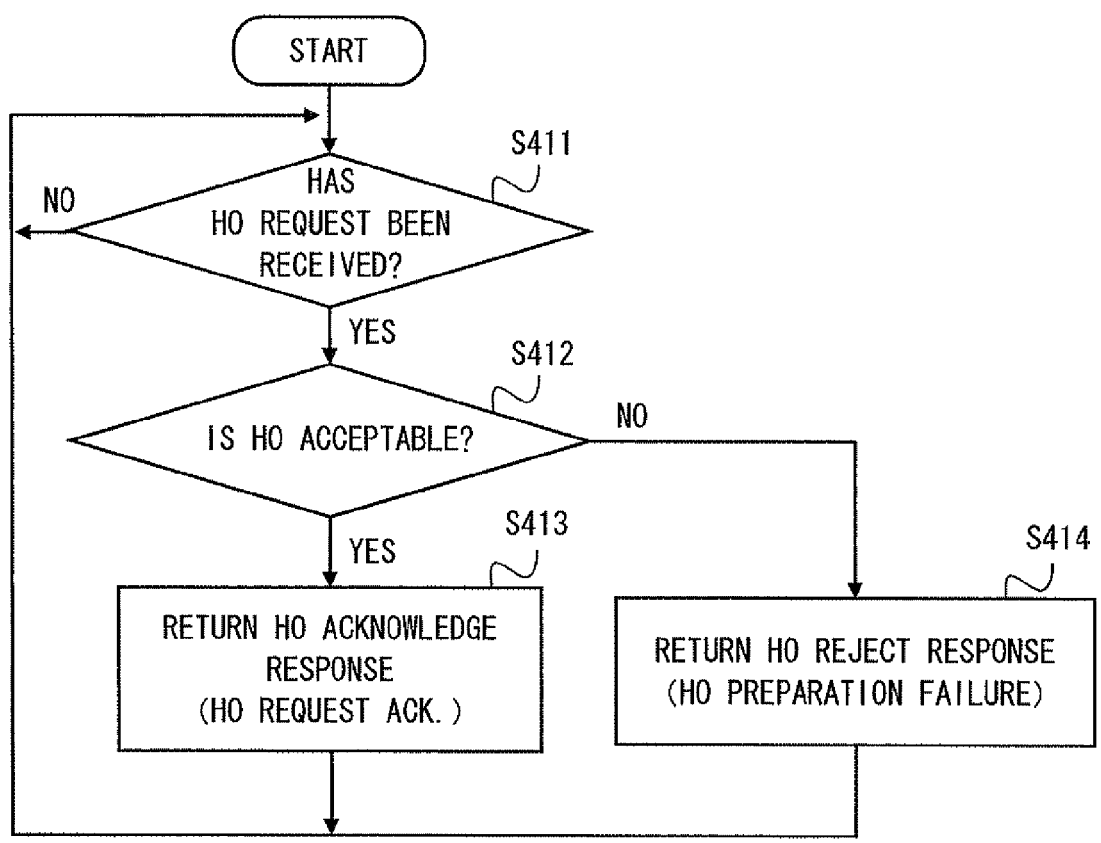
FIG. 10 is a flowchart showing a handover control procedure of the relay station 2 in the first exemplary embodiment of the invention.

Subsequently, a specific example of a control operation of the handover control unit 25 of the relay station 2 will be described with reference to the flowchart shown in FIG. 10. In step S411, the handover control unit 25 determines whether or not the handover request has been received via the DeNB (i.e. base station 1B). The handover control unit 25 investigates whether its own cell designated in the handover request can accept the handover. The investigation may be performed based on the own resource management. When the own cell can accept the handover (YES in step S412), the control unit 25 returns the handover acknowledge response including handover information on its own cell (step S413). On the other hand, when the handover request cannot be accepted (NO in step S412), the control unit 25 returns the handover reject response (step S414).

Figure 11:
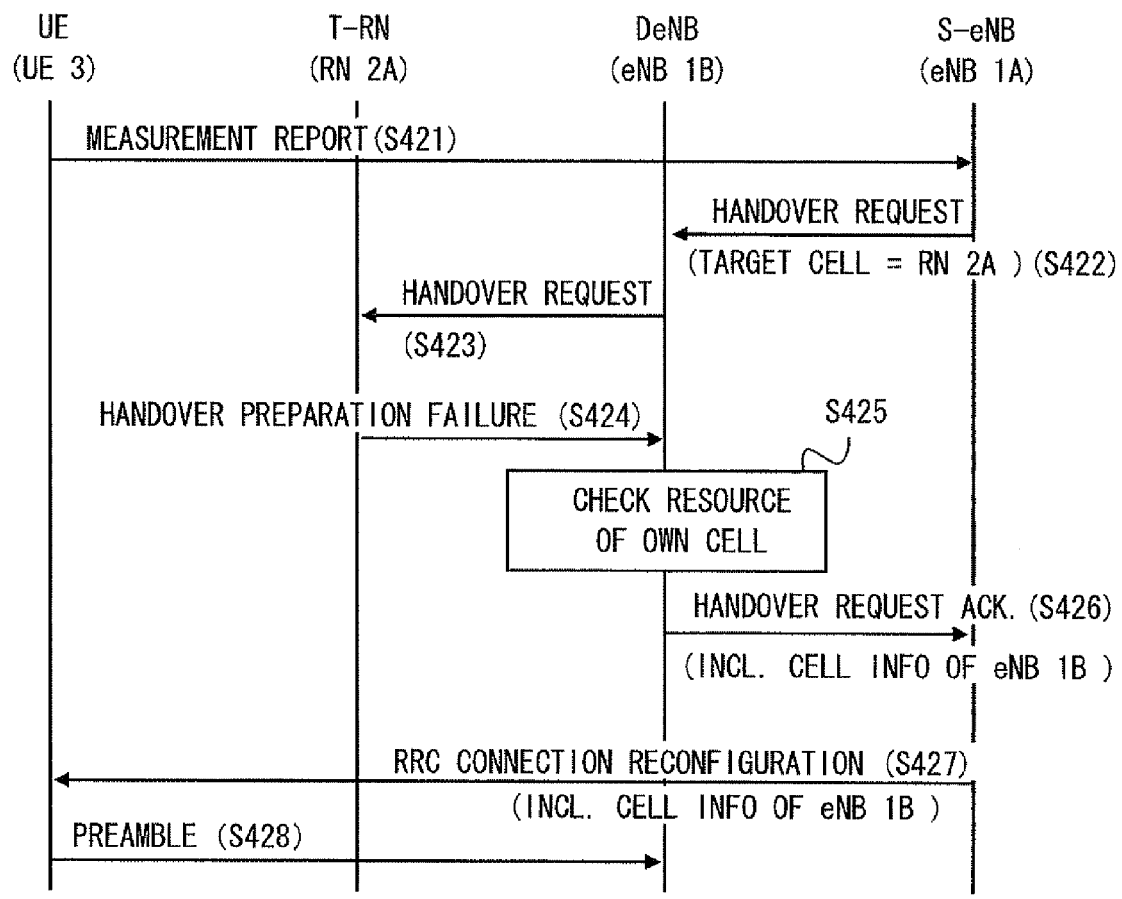
FIG. 11 is a sequence diagram showing a first example of a handover procedure of a mobile station in the first exemplary embodiment of the invention.

A specific example of a handover procedure of this exemplary embodiment will be described below with reference to a sequence diagram. A first example in the sequence diagram of FIG. 11 shows a case where the handover acknowledge response including information on the DeNB (base station 1B) is returned in response to the handover request designating the RN (relay station 2A) as the target cell. FIG. 11 shows an example of X2 handover.

In step S421, the base station 1A serving as the S-eNB receives a measurement report from the mobile station 3. The base station 1A decides the relay station 2A as the handover destination based on the measurement report, and transmits a handover request message (Handover Request), which designates the relay station 2A as the target cell, to the base station 1B serving as the DeNB (step S422). Upon receiving the handover request message designating the relay station 2A as the target cell, the base station 1B transfers the handover request message to the relay station 2A (step S423). In the example of FIG. 11, the relay station 2A cannot accept the handover request, and thus returns a handover reject response (Handover Preparation Failure) to the base station 1B (step S424).

The base station 1B having received the handover reject response investigates whether or not an adjacent cell can accept the handover. In the example shown in FIG. 11, the base station 1B checks the use status of the resource of its own cell (step S425). The base station 1B having determined that the handover is acceptable generates an acknowledge response message (Handover Request Acknowledge) including handover information on the base station 1B, and transmits the acknowledge response message to the base station 1A (step S426).

The base station 1A having received the acknowledge response message transmits an RRC connection reconfiguration message to the mobile station 3 (step S427). The mobile station 3 starts an RRC connection with the base station 1B by transmitting a random access preamble to the base station 1B (step S428).

Figure 12:
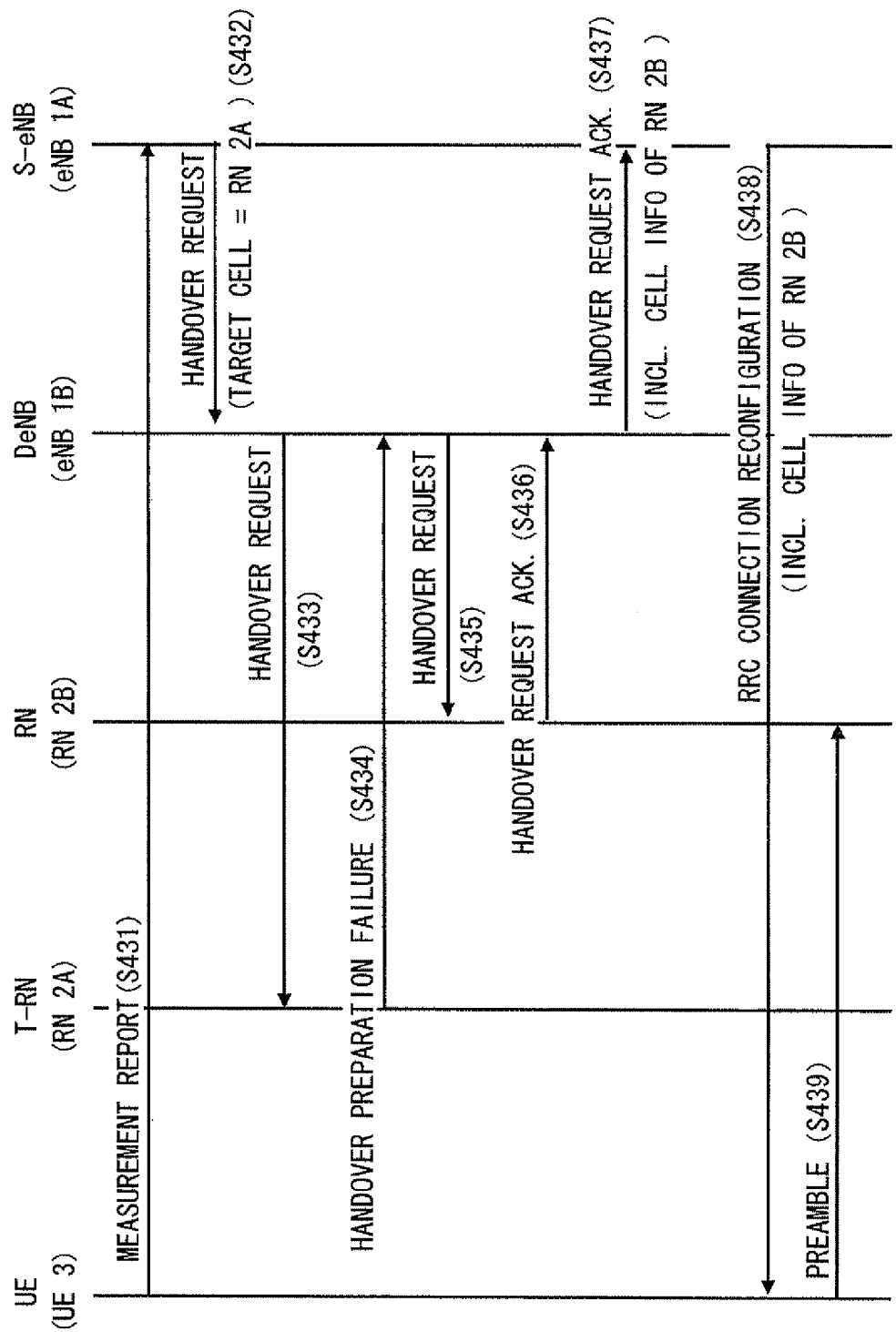
FIG. 12 is a sequence diagram showing a second example of the handover procedure of the mobile station in the first exemplary embodiment of the invention.

A second example in the sequence diagram of FIG. 12 shows a case where a handover acknowledge response including information on another RN (relay station 2B) is returned in response to a handover request designating the RN (relay station 2A) as a target cell. FIG. 12 also shows an example of X2 handover.

Steps S431 to S434 in FIG. 12 are similar to steps S421 to S424 of FIG. 11. The base station 1B having received the handover reject response investigates whether or not an adjacent cell can accept the handover. In the example of FIG. 12, the base station 1B generates a handover request that designates the other relay station 2B as the target cell, and transmits the handover request to the relay station 2B (step S435). The relay station 2B having determined that the handover is acceptable generates an acknowledge response message including handover information on the relay station 2B, and transmits the acknowledge response message to the base station 1B (step S436).

The base station 1B determines that the relay station 2B can accept the handover in response to receipt of the acknowledge response from the relay station 2B, and transmits the acknowledge response message including handover information on the relay station 2B to the base station 1A (step S437). The subsequent steps S438 and S439 are similar to steps S427 and S428 of FIG. 11.

Figure 13:
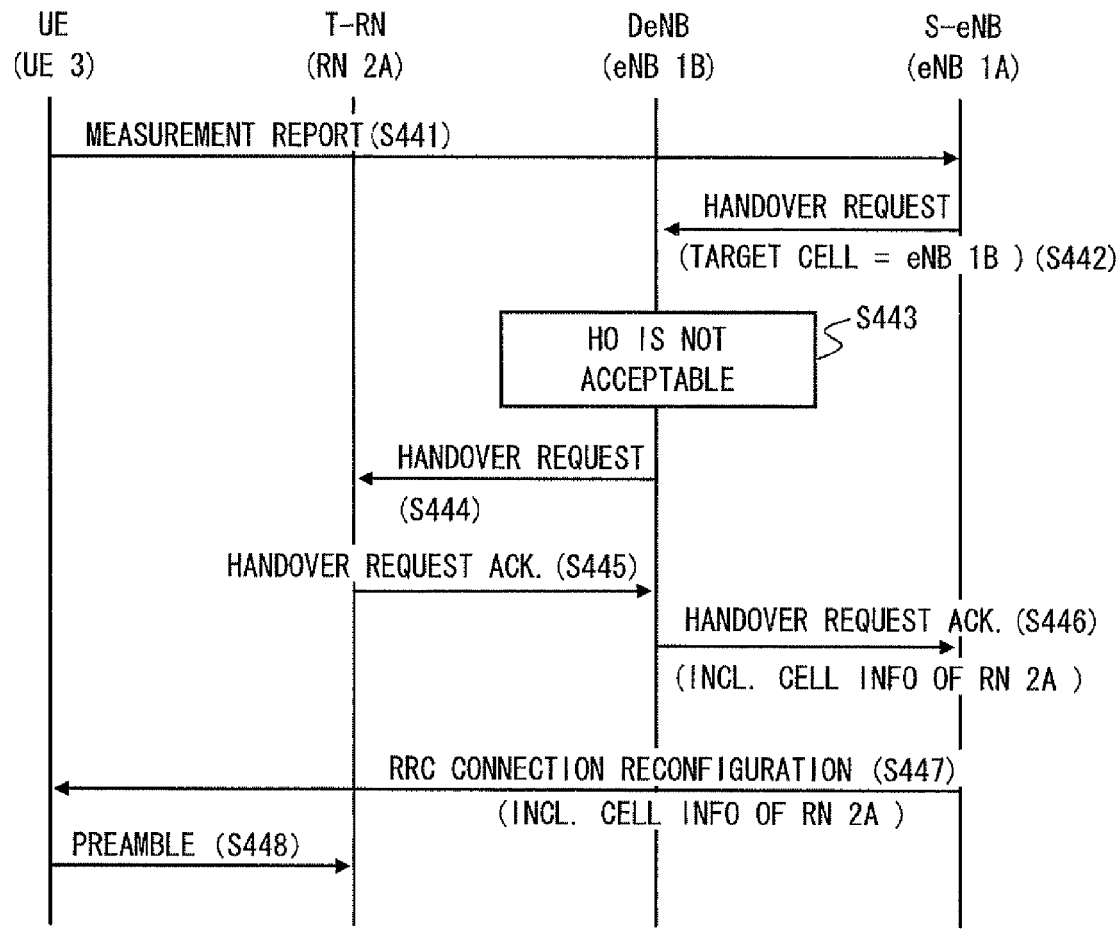
FIG. 13 is a sequence diagram showing a third example of the handover procedure of the mobile station in the first exemplary embodiment of the invention.

A third example in the sequence diagram of FIG. 13 shows a case where a handover acknowledge response including information on the RN (relay station 2A) is returned in response to a handover request designating the DeNB (base station 1B) as a target cell. FIG. 13 also shows an example of X2 handover.

Steps S441 to S442 of FIG. 13 are similar to steps S421 to S422 of FIG. 11. However, the target cell designated by the handover request is different. In step S443, the base station 1B checks the use status of the resource of its own cell that is designated as the target cell. In the example of FIG. 13, the base station 1B determines that its own cell cannot accept the handover (i.e. cannot accept the handover request) because the remaining resource is insufficient (step S443). Then, the base station 1B investigates whether or not an adjacent cell can accept the handover. In the example of FIG. 13, the base station 1B generates a handover request that designates another relay station 2A as the target cell, and transmits the handover request to the relay station 2A (step S444). The relay station 2A having determined that the handover can is acceptable generates an acknowledge response message including handover information on the relay station 2A, and transmits the acknowledge response message to the base station 1B (step S445).

The base station 1B determines that the relay station 2A can accept the handover in response to receipt of the acknowledge response from the relay station 2A, and transmits an acknowledge response message including handover information on the relay station 2A to the base station 1A (step S446). The subsequent steps S447 and S448 are similar to steps S427 and S428 of FIG. 11.

While examples of the X2 handover have been described with reference to FIGS. 11 to 13, an S1 handover can also be performed in a similar manner except that signaling via MME is performed.

As described above, in this exemplary embodiment, when the target cell designated in the handover request cannot accept the handover request, the target control apparatus (base station 1B) having received the handover request from the source control apparatus (base station 1A) investigates whether or not an adjacent cell can accept the handover, instead of immediately returning a reject response. Then, if there is an adjacent cell that can accept the handover, the target control apparatus (base station 1B) generates an acknowledge response including handover information on the adjacent cell, and transmits the acknowledge response to the source control apparatus.

In other words, the target control apparatus (base station 1B) investigates whether or not the target cell as well as an adjacent cell can accept the handover in response to a single handover request. Accordingly, the transmission of the rejection response message to the source control apparatus (base station 1A) and the retransmission of the handover request message from the source control apparatus (base station 1A) are omitted, so that extra signaling related to the handover procedure can be reduced.

<Second Exemplary Embodiment>

In a handover control system according to a second exemplary embodiment, a handover request message transmitted from the source control apparatus (base station 1A) can include designation of a plurality of handover destination candidates. The target control apparatus (base station 1B) can investigate whether or not the plurality of handover destination candidates can accept the handover in response to a single handover request message. Then, when at least one of the plurality of handover destination candidates can accept the handover, the target control apparatus (base station 1B) transmits a handover acknowledge response to the source control apparatus (base station 1A). Also in this exemplary embodiment, the transmission of the reject response message to the source control apparatus (base station 1A) and the retransmission of the handover request message from the source control apparatus (base station 1A) are omitted, so that extra signaling related to the handover procedure can be reduced.

Figure 14:
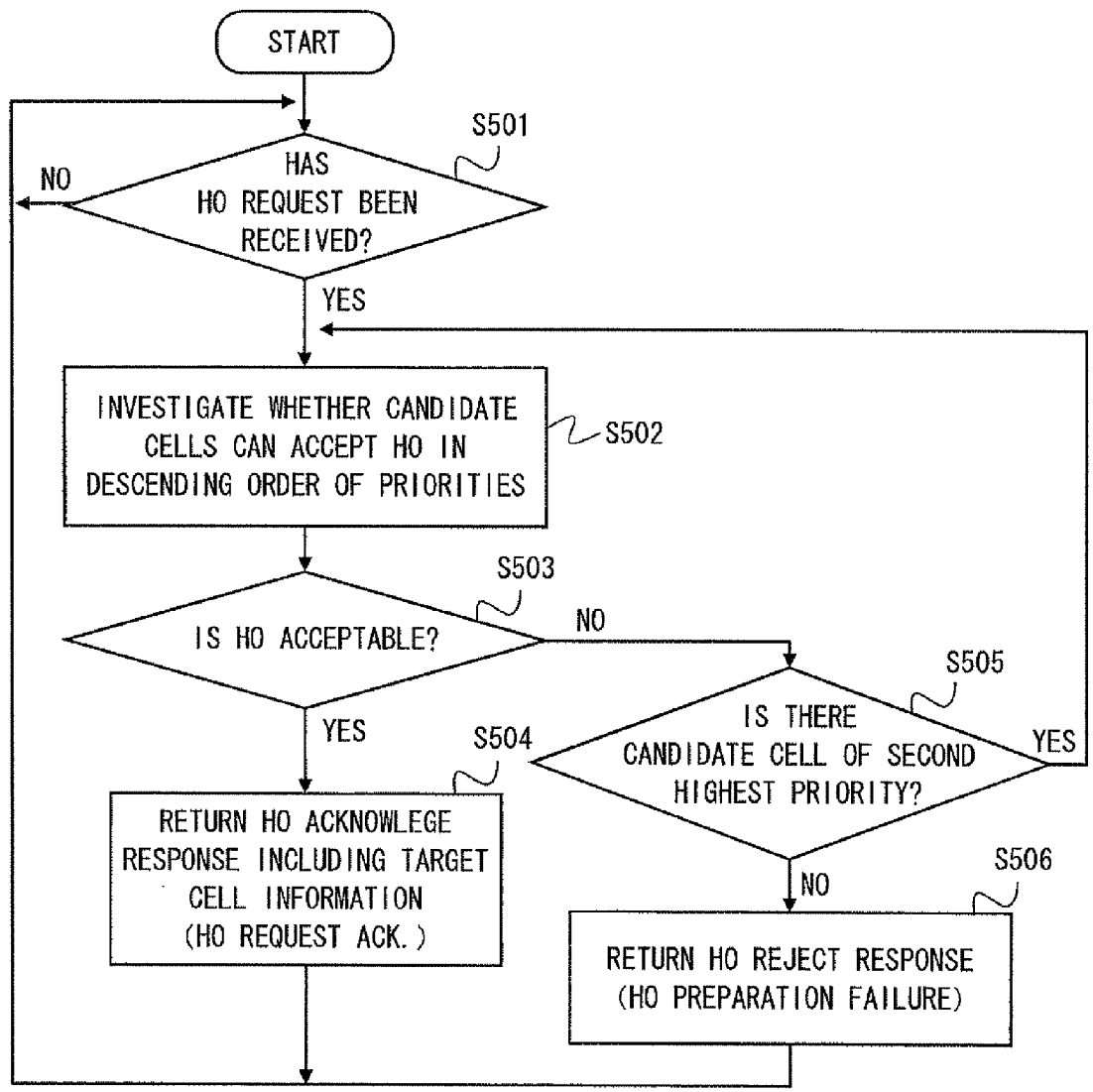
FIG. 14 is a flowchart showing a handover control procedure of the base station 1 in the second exemplary embodiment of the invention.

A specific example of a handover control of this exemplary embodiment will be described below. Note that the configuration of the handover control system according to this exemplary embodiment may be similar to that shown in FIGS. 6 to 8 described in the first exemplary embodiment. FIG. 14 is a flowchart showing a control procedure of the handover control unit 15 of the base station 1. FIG. 14 shows a specific example of operation in a case where the base station 1B receives the handover request as the T-eNB or the DeNB that mediates the T-RN.

In step S501, the handover control unit 15 determines whether or not the handover request has been received from the source control apparatus (base station 1A) or the CN5. Upon receiving the handover request (YES in step S501), the handover control unit 15 investigates whether any of a plurality of handover destination candidate cells designated in the handover request message can accept the handover (step S502). Note that in this exemplary embodiment, a priority order of the plurality of candidate cells is designated in the handover request message. Accordingly, the base station 1B may investigate handover possibilities in the order from the candidate cell having a highest priority.

The investigation of handover possibilities in step S502 may be performed in a procedure similar to that described in the first exemplary embodiment. That is, the investigation may be performed based on its own resource management when the candidate cell is its own cell. On the other hand, when the candidate cell is a cell generated by the relay station 2, the investigation may be performed based on whether the response received after the handover request is transferred to the relay station 2 is an acknowledge response or a reject response.

When a target candidate cell can accept the handover (YES in step S503), the control unit 15 returns the handover acknowledge response including handover information on the target candidate cell (step S504). On the other hand, when a target candidate cell cannot accept the handover (NO in step S503), the control unit 15 determines whether the candidate cell having a next highest priority is present (step S505). When the candidate cell having the next highest priority is present (YES in step S505), the control unit 15 returns to step S502 and repeats the process. When the candidate cell having the next highest priority is not present (NO in step S505), the control unit 15 returns the handover reject response (step S506).

Figure 15:
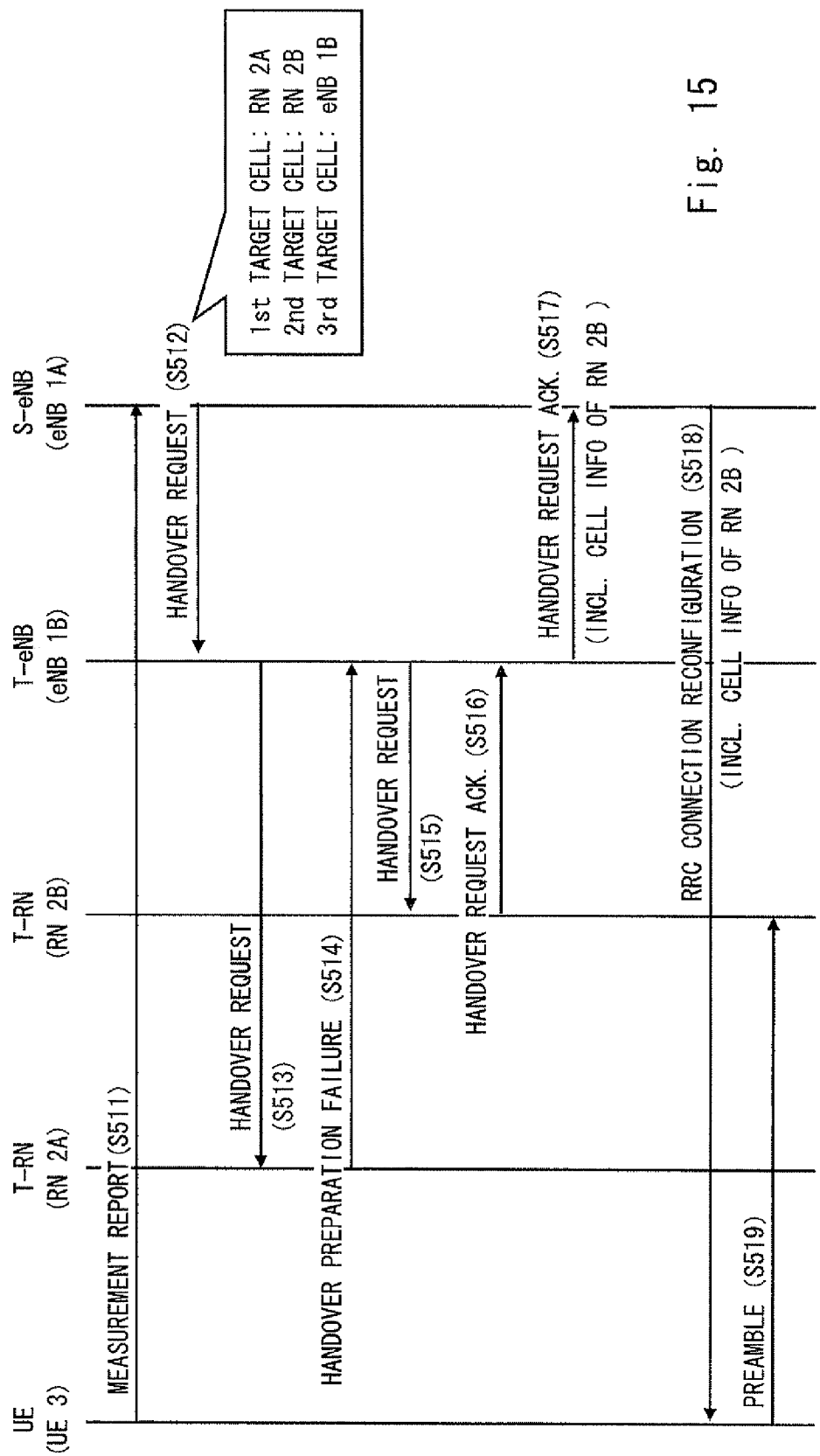
FIG. 15 is a sequence diagram showing an example of a handover procedure of a mobile station in the second exemplary embodiment of the invention.

The sequence diagram of FIG. 15 shows a specific example of the handover procedure of this exemplary embodiment. In step S511, the base station 1A serving as the S-eNB receives a measurement report from the mobile station 3. The base station 1A determines the priority order of handover destination candidates based on the measurement report. For example, the base station 1A may determine the priority order of the candidates in descending order of radio reception quality. Alternatively, the base station 1A may determine the priority order depending on the cell type (eNB cell or RN cell) or the cell size. More alternatively, the base station 1A may determine the priority order in consideration of the radio reception quality as well as the cell type. Moreover, the priority order may be determined by the mobile station 3 which has transmitted the measurement report.

In step S512, the handover request message including designation of a plurality of candidate cells and designation of the priority order is transmitted to the base station 1B serving as the DeNB (step S512). Herein assume that the priority is given in the order of the relay station 2A, the relay station 2B, and the base station 1B. Note that the method of designating the priority order in the handover request message is not particularly limited. For example, the priority order may be designated in the order of arrangement of the plurality of candidate cells in the handover request message. The handover request message may also include an evaluated value (e.g. a value of radio reception quality) as a criterion of the priority order.

Upon receiving the handover request message, the base station 1B serving as the DeNB investigates whether or not a candidate cell can accept the handover, in accordance with the designated priority order. Specifically, since an investigation as to whether or not the relay station 2A can accept the handover is performed first, the base station 1B transfers the handover request message to the relay station 2A (step S513). In the example of FIG. 15, the relay station 2A cannot accept the handover, and thus returns the handover reject response (Handover Preparation Failure) to the base station 1B (step S514).

The base station 1B having received the handover reject response investigates whether or not the candidate cell having the next highest priority, i.e., the relay station 2B, can accept the handover. Accordingly, the base station 1B transfers the handover request message to the relay station 2B (step S515).

In the example of FIG. 15, the relay station 2B, which can accept the handover, generates an acknowledge response message including handover information on the relay station 2B, and transmits the acknowledge response message to the base station 1B (step S516).

The base station 1B determines that the relay station 2B can accept the handover in response to receipt of the acknowledge response from the relay station 2B, and transmits the acknowledge response message including the handover information on the relay station 2B to the base station 1A (step S517). The subsequent steps S518 and S519 are similar to steps S427 and S428 of FIG. 11.

While an example of the X2 handover has been described with reference to FIG. 15, an S1 handover can also be performed in a similar manner except that signaling via MME is performed.

<Third Exemplary Embodiment>

In the second exemplary embodiment described above, an example has been described in which the source control apparatus (base station 1A) generates and transmits a handover request designating a plurality of candidate cells and a priority order of these candidate cells. In this exemplary embodiment, an example is described in which the target control apparatus (base station 1B), which has received the handover request including designation of the plurality of candidate cells, determines the priority order. Note that the priority order of the plurality of candidate cells may be designated also in the handover request. In this case, the target control apparatus (base station 1B) may calculate the priority order in accordance with its own criteria without depending on the priority order designated in the handover request. Alternatively, the target control apparatus (base station 1B) may calculate a new priority order in consideration of a combination of the priority order designated in the handover request and other evaluation criteria.

Figure 16:
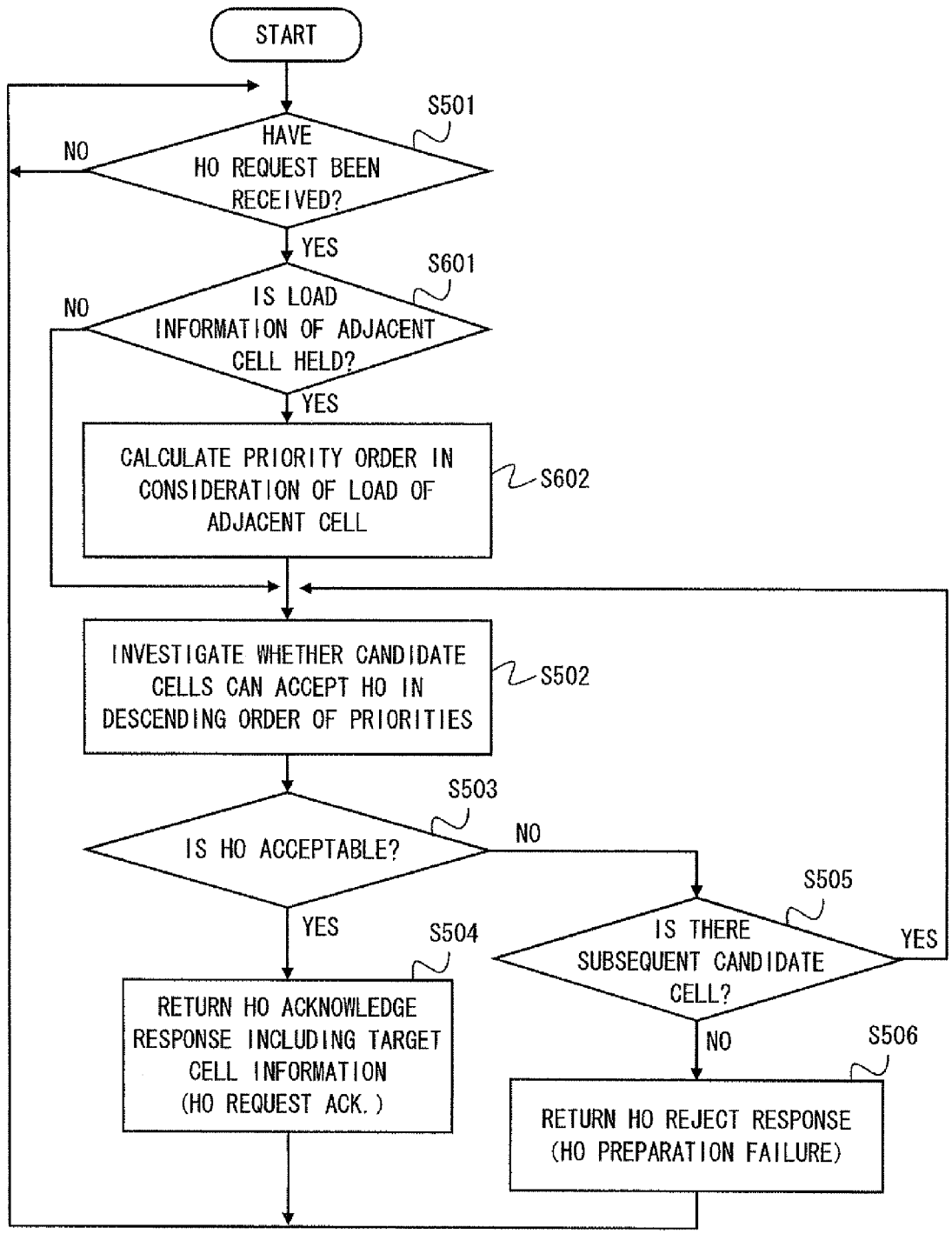
FIG. 16 is a flowchart showing a handover control procedure of the base station 1 in the third exemplary embodiment of the invention.

A specific example of a handover control of this exemplary embodiment will be described below. Note that the configuration of the handover control system according to this exemplary embodiment may be similar to that shown in FIGS. 6 to 8 described in the first exemplary embodiment. FIG. 16 is a flowchart showing a control procedure of the handover control unit 15 of the base station 1. In the flowchart shown in FIG. 16, steps S601 and S602 related to the determination of the priority order are added between steps S501 and S502 of the flowchart shown in FIG. 14. Accordingly, the steps of FIG. 16 which are common to those of FIG. 14 are denoted by the same reference numerals shown in FIG. 14, and a redundant explanation thereof is omitted.

In step S601, the control unit 15 determines whether load information of adjacent cells (cells 42A and 42B) is held. The control unit 15 may regularly collect the load information from the neighboring relay stations 2A and 2B. The relay stations 2A and 2B may autonomously transmit the load information to the base station 1B when there is a change in load status. For example, the number of mobile stations belonging to the cell of the relay station 2 can be used as the load information. More specifically, the number of the mobile stations 3 that have transmitted or received data to or from the relay station 2 within a predetermined period of time may be used as the load information. Alternatively, the number of the mobile stations 3 that are connected (in a connected mode) to the relay station 2 at a certain time point may be used as the load information. More alternatively, a usage rate of a radio resource block, or transmission power of a base station or a relay station, for example, may be used as the load information.

In step S602, the priorities of a plurality of candidate cells are calculated in consideration of the load status of adjacent cells. Specifically, the priorities may be determined such that relatively high priorities are given to candidate cells with a relatively small load.

Figure 17:
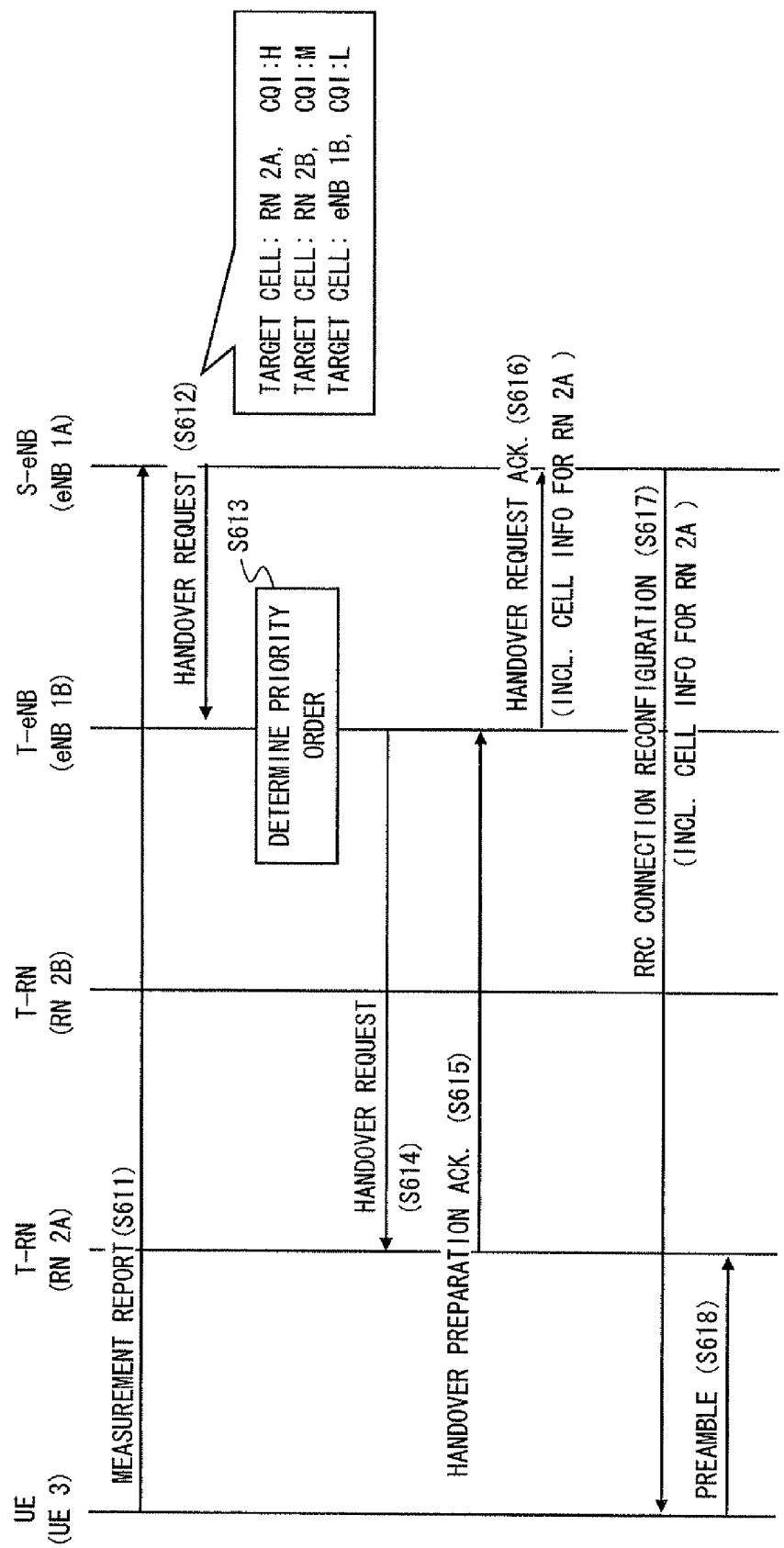
FIG. 17 is a sequence diagram showing an example of a handover procedure of a mobile station in the third exemplary embodiment of the invention.

The sequence diagram of FIG. 17 shows a specific example of the handover procedure of this exemplary embodiment. In step S611, the base station 1A serving as the S-eNB receives a measurement report from the mobile station 3. The base station 1A generates a handover request message including designation of a plurality of handover destination candidate cells determined based on the measurement report, and transmits the handover request message to the base station 1B serving as the DeNB (step S612). In the handover request message, the priority order of the candidate cells may be designated. In the example of FIG. 17, a radio reception quality level is designated by a CQI (Channel Quality Indicator).

In step S613, the base station 1B determines the priority order of the plurality of candidate cells included in the handover request message based on the load information collected from the neighboring relay stations 2A and 2B and the load status of its own cell. As a result of the determination, the relay station 2A has the highest priority in the example of FIG. 17. Accordingly, the base station 1B investigates whether or not the relay station 2A can accept the handover. Specifically, the base station 1B transmits the handover request message to the relay station 2A (step S614). In the example of FIG. 17, the relay station 2A can accept the handover, and thus generates an acknowledge response message including handover information on the relay station 2A and transmits the acknowledge response message to the base station 1B (step S615).

The base station 1B determines that the relay station 2A can accept the handover in response to receipt of the acknowledge response from the relay station 2A, and transmits the acknowledge response message including the handover information on the relay station 2A to the base station 1A (step S616). The subsequent steps S617 and S618 are similar to steps S427 and S428 of FIG. 11.

While an example of the X2 handover has been described with reference to FIG. 17, an S1 handover can also be performed in a similar manner except that signaling via MME is performed.

As described in the embodiment, the calculation of the priority order depending on the load status makes it possible to preferentially perform the handover request to a cell that is highly likely to accept the handover. As a result, generation of the handover reject response message can be further suppressed and generation of extra signaling can be further suppressed. An operation form is assumed in which the number of mobile stations that can be accommodated in the relay station 2 is limited compared to the normal base station (eNB). This exemplary embodiment is especially effective when such a limitation is provided.

Note that the criteria for calculating the priority order of a plurality of candidate cells by the target control apparatus (base station 1B) having received the handover request including designation of the plurality of candidate cells are not limited to the load status described above. For example, the priority order may be determined based on preset priorities of cells (cell priority). When the cells 42A and 42B of the relay stations 2A and 2B having a small cover area and the cell 41B of the base station 1B having a large cover area are hierarchically arranged, for example, the priorities of the cells 42A and 42B may be set to be higher than the priority of the cell 41B, and the mobile station 3 may be allowed to preferentially make a handover to the cell 42A and 42B. This alleviates traffic concentration on the base station 1B having a large cover area.

The first to third exemplary embodiments have described an example in which the technical idea of "investigating handover possibilities of a plurality of cells in response to a single handover request and retuning a handover acknowledge response when at least one of the cells can accept the handover" is applied to an Inter-eNB handover in a network using a RN. However, the above-mentioned technical idea can also be applied to other network forms. In the following first to fifth modified examples, specific examples are described in which the above-mentioned technical idea is applied to (a) an Intra-eNB handover in a network using a RN, (b) an Inter-eNB handover in a network using no RN, and (c) an Inter-RNC handover in a UTRAN network, for example.

FIRST MODIFIED EXAMPLE

Figure 18:
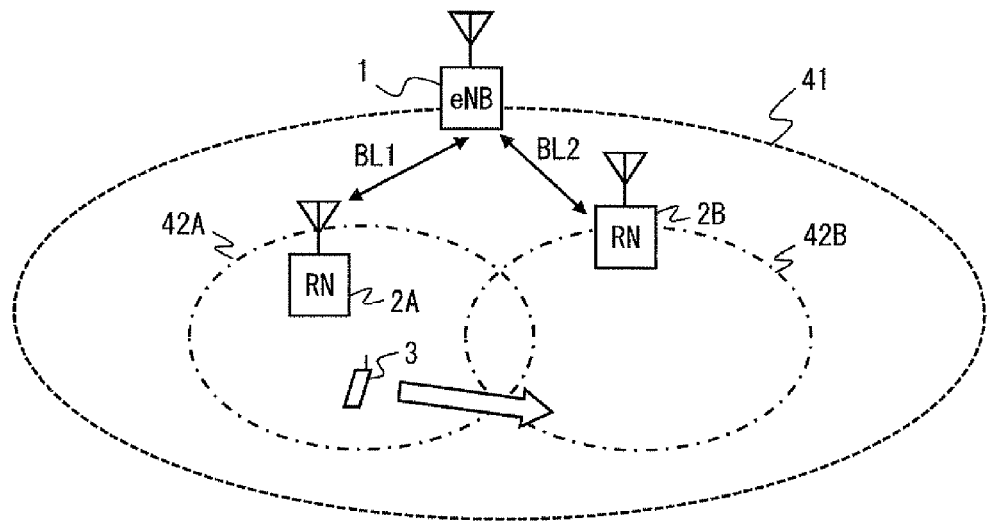
FIG. 18 is a block diagram showing a configuration example of a handover control system according to a first modified example.

In the first modified example, a case is described in which the first exemplary embodiment described above is applied to an Intra-eNB handover in a network using a RN. FIG. 18 is a configuration example of a mobile communication system including a handover control system. Herein, consider a case where the mobile station 3 belonging to the cell 42A of the relay station 2A makes a handover to the cell 42B of the relay station 2B.

Figure 19:
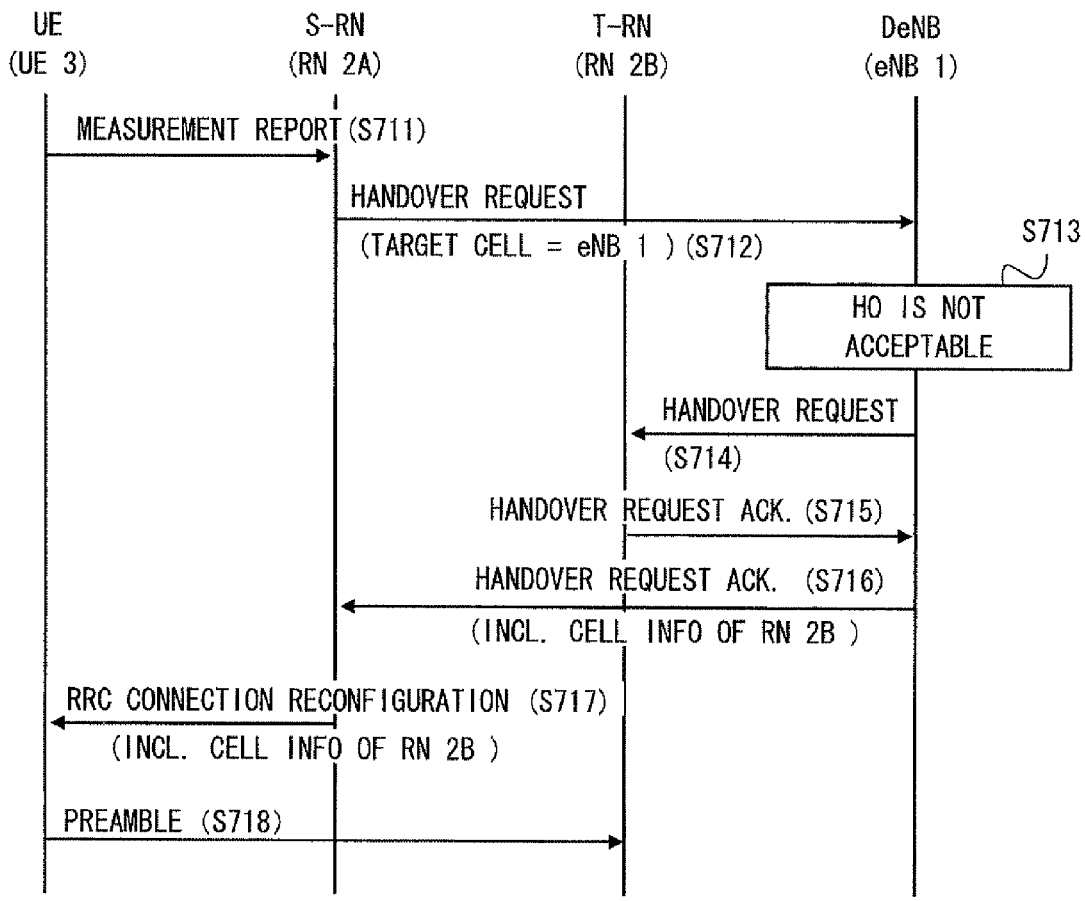
FIG. 19 is a sequence diagram showing an example of a handover procedure of a mobile station in the first modified example.

FIG. 19 shows a case where a handover acknowledge response including information on the RN (relay station 2B) is returned in response to the handover request designating the DeNB (base station 1) as the target cell. In step S711, the relay station 2A serving as the S-RN receives a measurement report from the mobile station 3. The relay station 2A decides the base station 1 as the handover destination based on the measurement report, and transmits a handover request message (Handover Request) designating the base station 1 as the target cell to the base station 1 serving as the DeNB (step S712).

In step S713, the base station 1 checks the use status of the resource of its own cell designated as the target cell. In the example of FIG. 19, the base station 1 determines that its own cell cannot accept the handover (cannot accept the handover request) because the remaining resource is insufficient (step S713). Then, the base station 1 investigates whether or not an adjacent cell can accept the handover. In the example of FIG. 19, the base station 1 generates a handover request designating the relay station 2B as the target cell, and transmits the handover request to the relay station 2B (step S714). The relay station 2B having determined that the handover is acceptable generates an acknowledge response message including handover information on the relay station 2B, and transmits the acknowledge response message to the base station 1 (step S715).

The base station 1 determines that the relay station 2B can accept the handover in response to receipt of the acknowledge response from the relay station 2B, and transmits the acknowledge response message including the handover information on the relay station 2B to the relay station 2A (step S716). The subsequent steps S717 and S718 are similar to steps S427 and S428 of FIG. 11.

SECOND MODIFIED EXAMPLE

In the second modified example, a case is described in which the first exemplary embodiment described above is applied to an Intra-eNB handover in a network using a RN, as in the first modified example. A configuration example of the mobile communication system of this exemplary embodiment is similar to that shown in FIG. 18. Herein, consider a case where the mobile station 3 belonging to the cell 42A of the relay station 2A makes a handover to the cell 41 of the base station 1.

Figure 20:
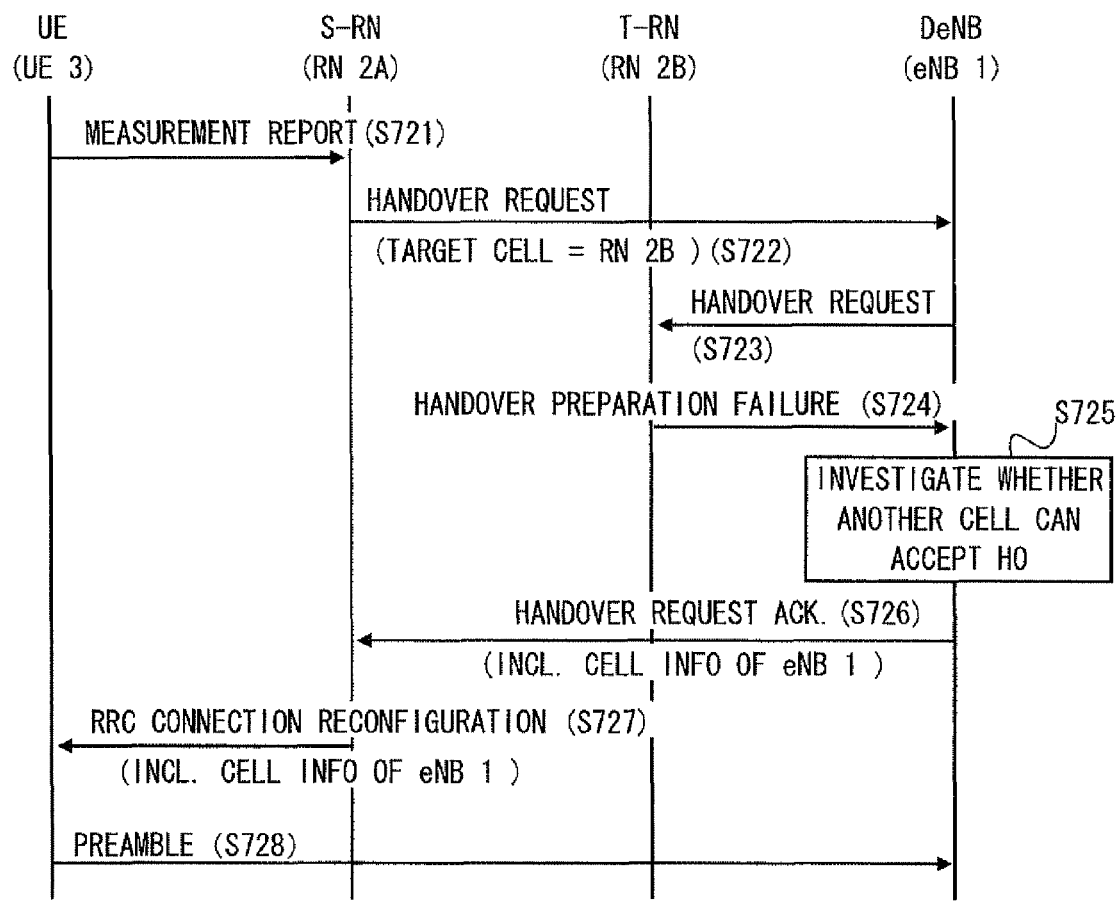
FIG. 20 is a sequence diagram showing an example of a handover procedure of a mobile station in a second modified example.

FIG. 20 shows a case where a handover acknowledge response including information on the DeNB (base station 1) is returned in response to a handover request designating the RN (relay station 2B) as the target cell. In step S721, the relay station 2A serving as the S-RN receives a measurement report from the mobile station 3. The relay station 2A decides the relay station 2B as the handover destination based on the measurement report, and transmits a handover request message (Handover Request) designating the relay station 2B as the target cell to the base station 1 serving as the DeNB (step S722).

Upon receiving the handover request message designating the relay station 2B as the target cell, the base station 1 transfers the handover request message to the relay station 2B (step S723). In the example of FIG. 20, the relay station 2B cannot accept the handover request, and thus returns a handover reject response (Handover Preparation Failure) to the base station 1 (step S724).

The base station 1 having received the handover reject response investigates whether or not a adjacent cell can accept the handover. In the example of FIG. 20, the base station 1 checks the use status of the resource of its own cell (step S725). The base station 1 having determined that the handover is acceptable generates an acknowledge response message (Handover Request Acknowledge) including handover information on the base station 1, and transmits the acknowledge response message to the relay station 2A (step S726). The subsequent steps S727 and S728 are similar to steps S427 and S428 of FIG. 11.

THIRD MODIFIED EXAMPLE

Figure 21:
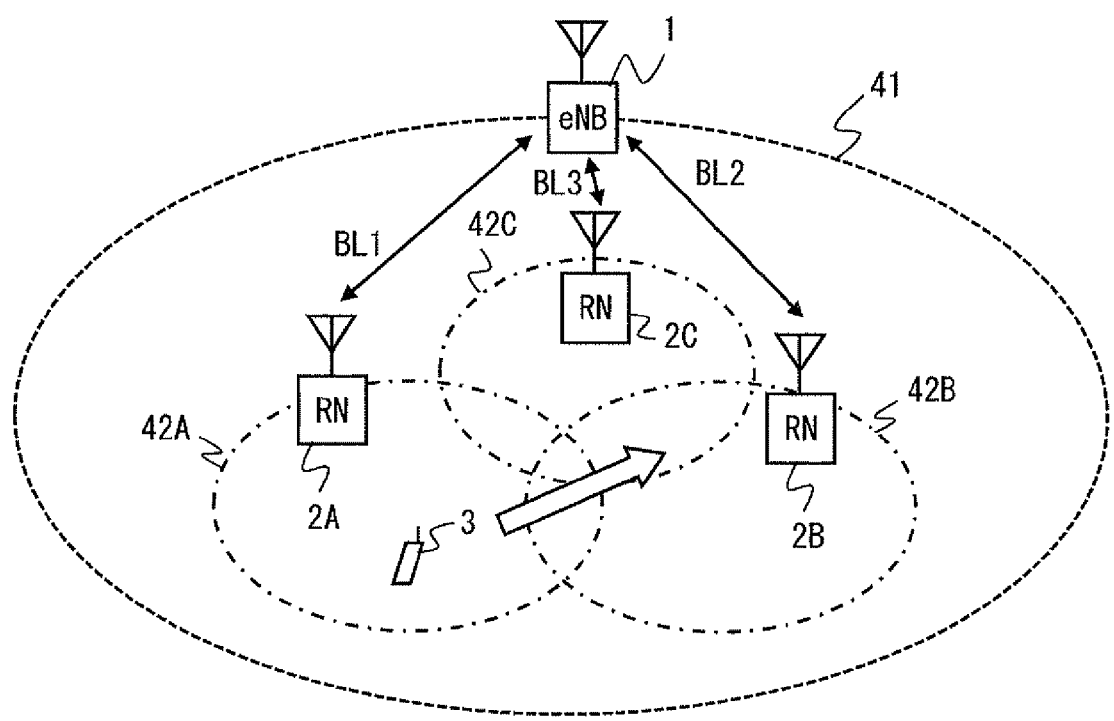
FIG. 21 is a block diagram showing a configuration example of a handover control system according to a third modified example.

In the third modified example, a case is described in which the second exemplary embodiment described above is applied to an Intra-eNB handover in a network using a RN. FIG. 21 is a diagram showing a configuration example of a mobile communication system including a handover control system. Herein, consider a case where the mobile station 3 belonging to the cell 42A of the relay station 2A makes a handover to the cell 41 of the base station 1, the cell 42B of the relay station 2B, or the cell 42C of the relay station 2C.

FIG. 19 shows a case where a handover acknowledge response including information on the relay station 2C is returned in response to a handover request designating the DeNB (base station 1) and other RNs (relay stations 2B and 2C) as a plurality of candidate cells. In step S731, the relay station 2A serving as the S-RN receives a measurement report from the mobile station 3. The relay station 2A determines the priority order of the plurality of candidate cells based on the measurement report, and transmits a handover request message (Handover Request) designating the plurality of cell candidates and the priority order of the candidates to the base station 1 serving as the DeNB (step S732). Assume herein that the priority is given in the order of the relay station 2B, the relay station 2C, and the base station 1.

Figure 22:
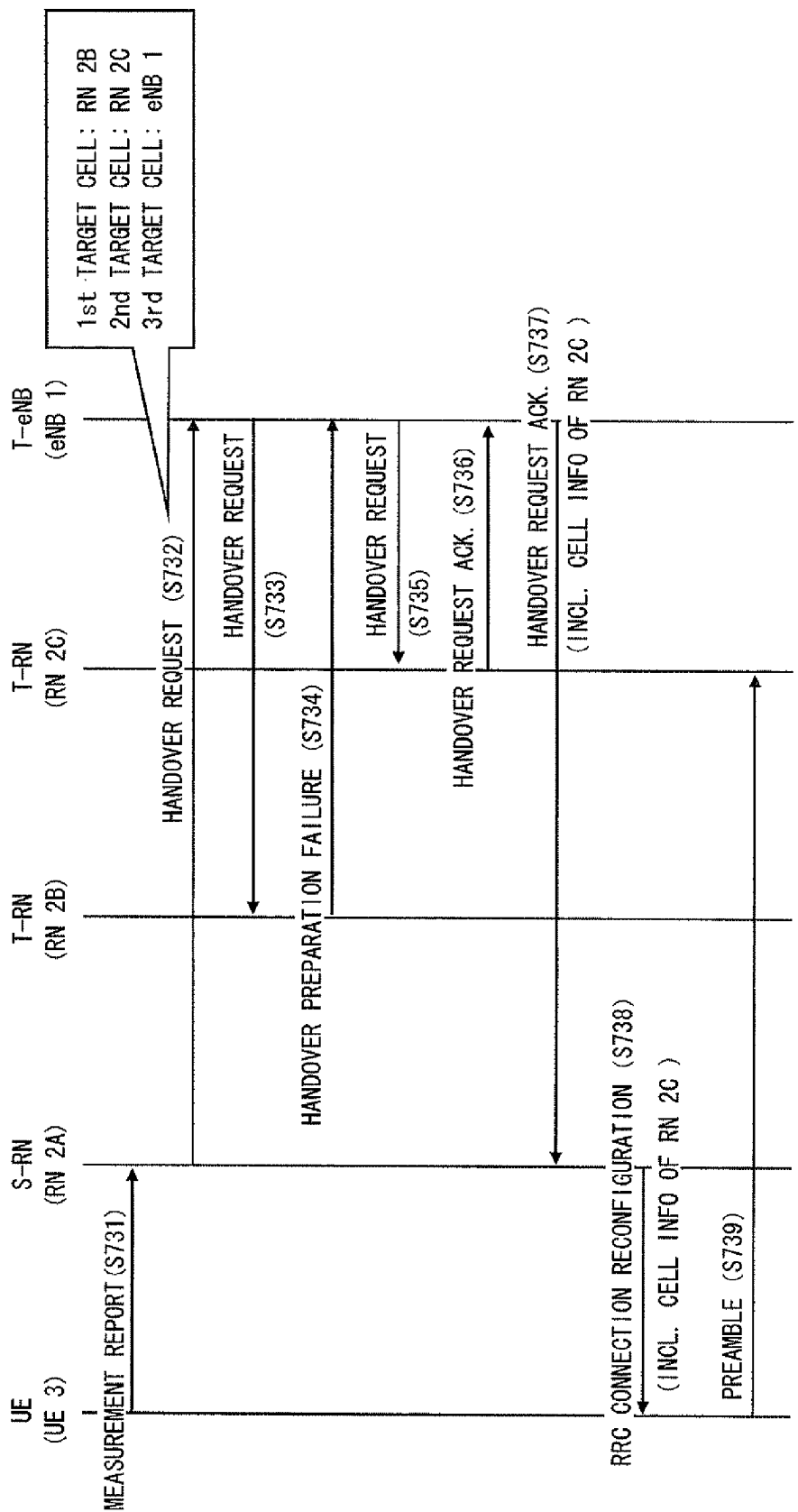
FIG. 22 is a sequence diagram showing an example of a handover procedure of a mobile station in the third modified example.

Upon receiving the handover request message, the base station 1 serving as the DeNB investigates handover possibilities of the candidate cells in accordance with the designated priority order. Specifically, since an investigation as to whether or not the relay station 2B can accept the handover is performed first, the base station 1 transfers the handover request message to the relay station 2B (step S733). In the example of FIG. 22, the relay station 2B cannot accept the handover request, and thus returns a handover reject response (Handover Preparation Failure) to the base station 1 (step S734).

The base station 1 having received the handover reject response investigates whether or not the candidate cell having the next highest priority, i.e., the relay station 2C, can accept the handover. Accordingly, the base station 1 transfers the handover request message to the relay station 2C (step S735). In the example of FIG. 22, the relay station 2C can accept the handover, and thus generates an acknowledge response message including handover information on the relay station 2C, and transmits the acknowledge response message to the base station 1 (step S736).

The base station 1 determines that the relay station 2C can accept the handover in response to receipt of the acknowledge response from the relay station 2C, and transmits the acknowledge response message including the handover information on the relay station 2C to the base station 1 (step S737). The subsequent steps S738 and S739 are similar to steps S427 and S428 of FIG. 22.

In this modified example, a modification of the second exemplary embodiment has been described, but the third exemplary embodiment described above can also be applied to the Intra-eNB handover.

FOURTH MODIFIED EXAMPLE

Figure 23:
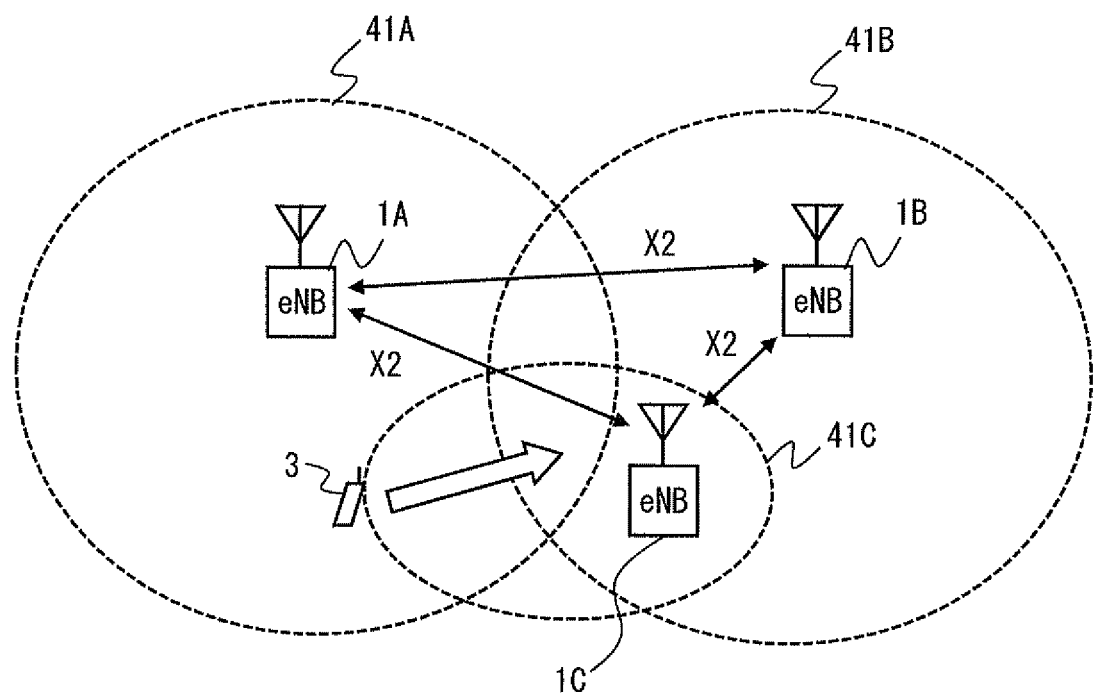
FIG. 23 is a block diagram showing a configuration example of a handover control system according to a fourth modified example.

In the fourth modified example, a case is described in which the first exemplary embodiment described above is applied to an Inter-eNB handover in a network using no RN. FIG. 23 is a diagram showing a configuration example of a mobile communication system including a handover control system. Herein, consider a case where the mobile station 3 belonging to the cell 41A of the base station 1A makes a handover to the cell 41B of the base station 1B or the cell 41C of the base station 1C.

Figure 24:
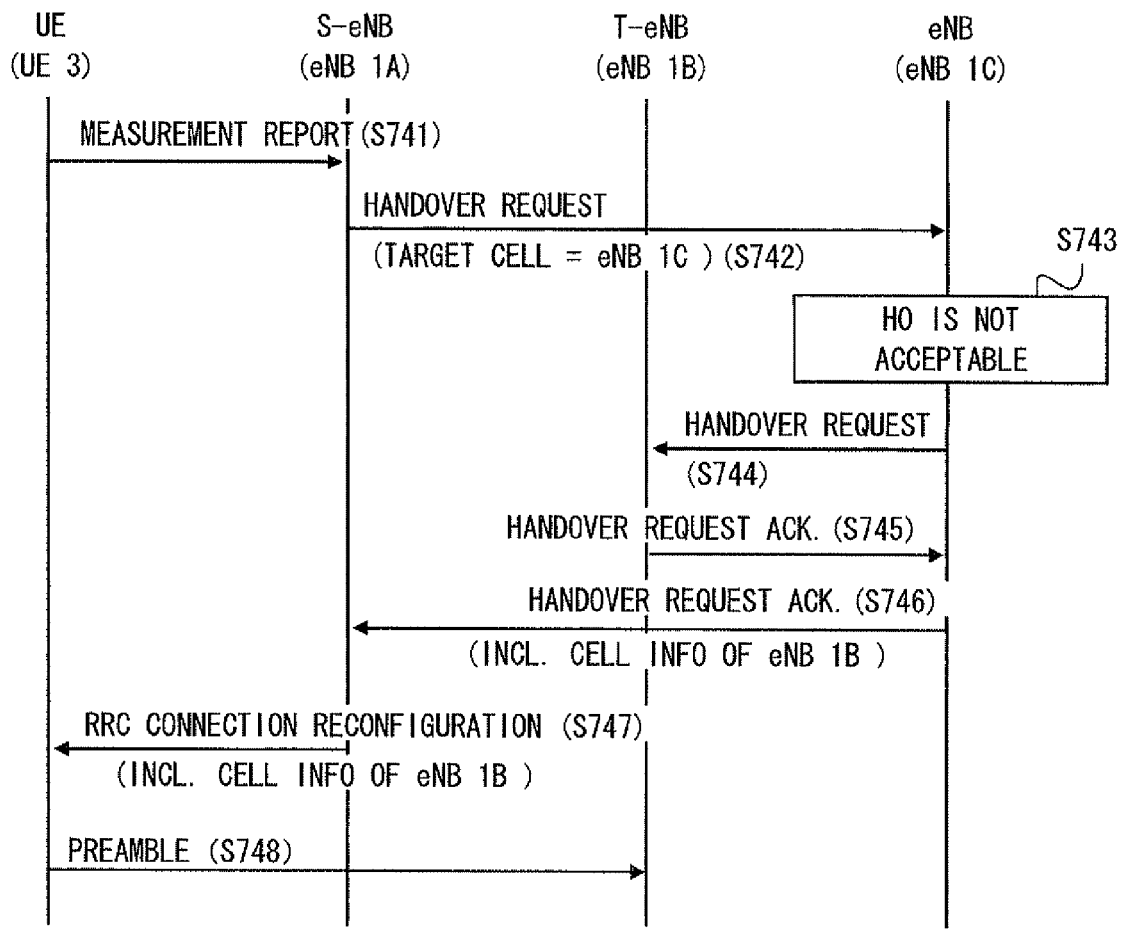
FIG. 24 is a sequence diagram showing an example of a handover procedure of a mobile station in the fourth modified example.

FIG. 24 shows a case where a handover acknowledge response including information on the base station 1B is returned in response to a handover request designating the base station 1C as a target cell. In step S741, the base station 1A serving as the S-eNB receives a measurement report from the mobile station. The base station 1A decides the base station 1C as the handover destination based on the measurement report, and transmits a handover request message (Handover Request) designating the base station 1C as the target cell to the base station 1C (step S742).

In step S743, the base station 1C checks the use status of the resource of its own cell designated as the target cell. In the example of FIG. 24, the base station 1 determines that its own cell cannot accept the handover (cannot accept the handover request) because the remaining resource is insufficient (step S743). Then, the base station 1C investigates whether or not an adjacent cell can accept the handover. In the example of FIG. 24, the base station 1C generates a handover request designating the base station 1B as the target cell, and transmits the handover request to the base station 1B (step S744). The base station 1B having determined that the handover is acceptable generates an acknowledge response message including handover information on the base station 1B, and transmits the acknowledge response message to the base station 1C (step S745).

The base station 1C determines that the base station 1B can accept the handover in response to receipt of the acknowledge response from the base station 1B, and transmits an acknowledge response message including handover information on the base station 1B to the base station 1A (step S746). The subsequent steps S747 and S748 are similar to steps S427 and S428 of FIG. 11.

Also in this modified example, at least the transmission of the reject response message depending on the determination in step S643 is omitted.

Although no specific example is given, the second and third exemplary embodiments may also be applied to the Inter-eNB handover in a network using no RN.

FIFTH MODIFIED EXAMPLE

Figure 25:
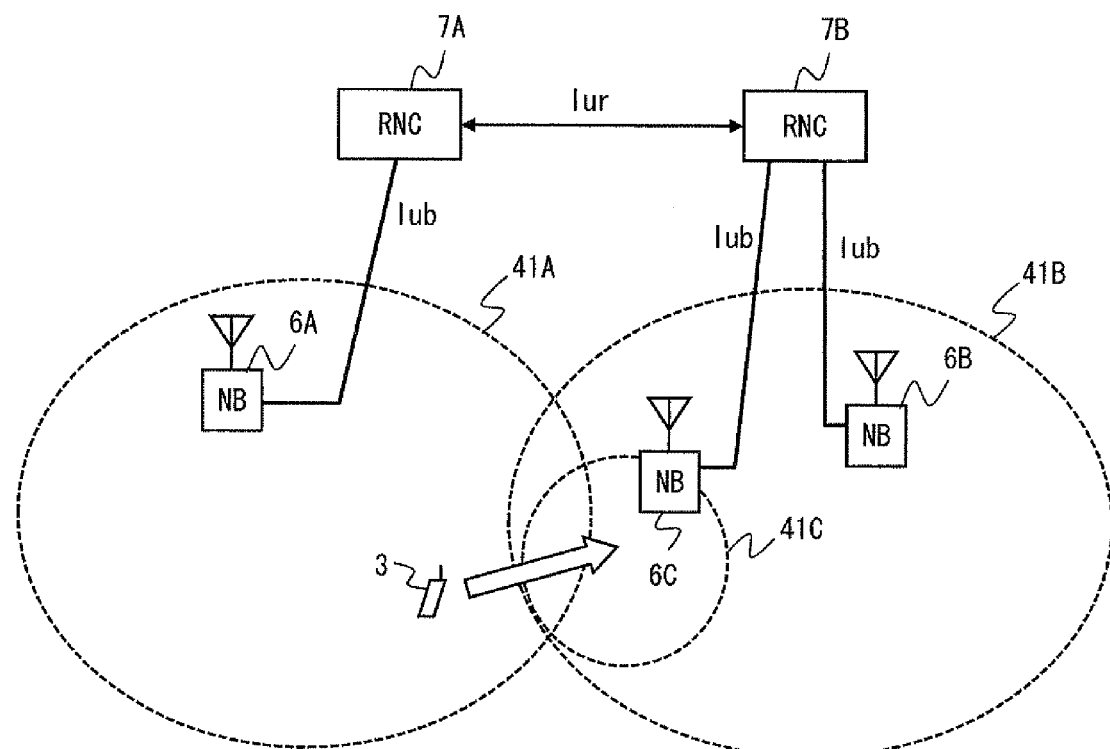
FIG. 25 is a block diagram showing a configuration example of a handover control system according to a fifth modified example.

In the fifth modified example, a case is described in which the first exemplary embodiment described above is applied to an Inter-RNC handover in a UTRAN network. FIG. 25 is a diagram showing a configuration example of a mobile communication system including a handover control system. Base stations (NodeB) 6A to 6C generate the cells 41A to 41C, respectively. The base station 6A is connected to an RNC 7A via an Iub interface, and the base stations 6B and 6C are each connected to an RNC 7B via an Iub interface. The RNCs 7A and 7B are connected together via an Iur interface. Here, consider a case where the mobile station 3 belonging to the cell 41A of the base station 1A makes a handover to the cell 41B of the base station 1B or the cell 41C of the base station 1C.

Figure 26:
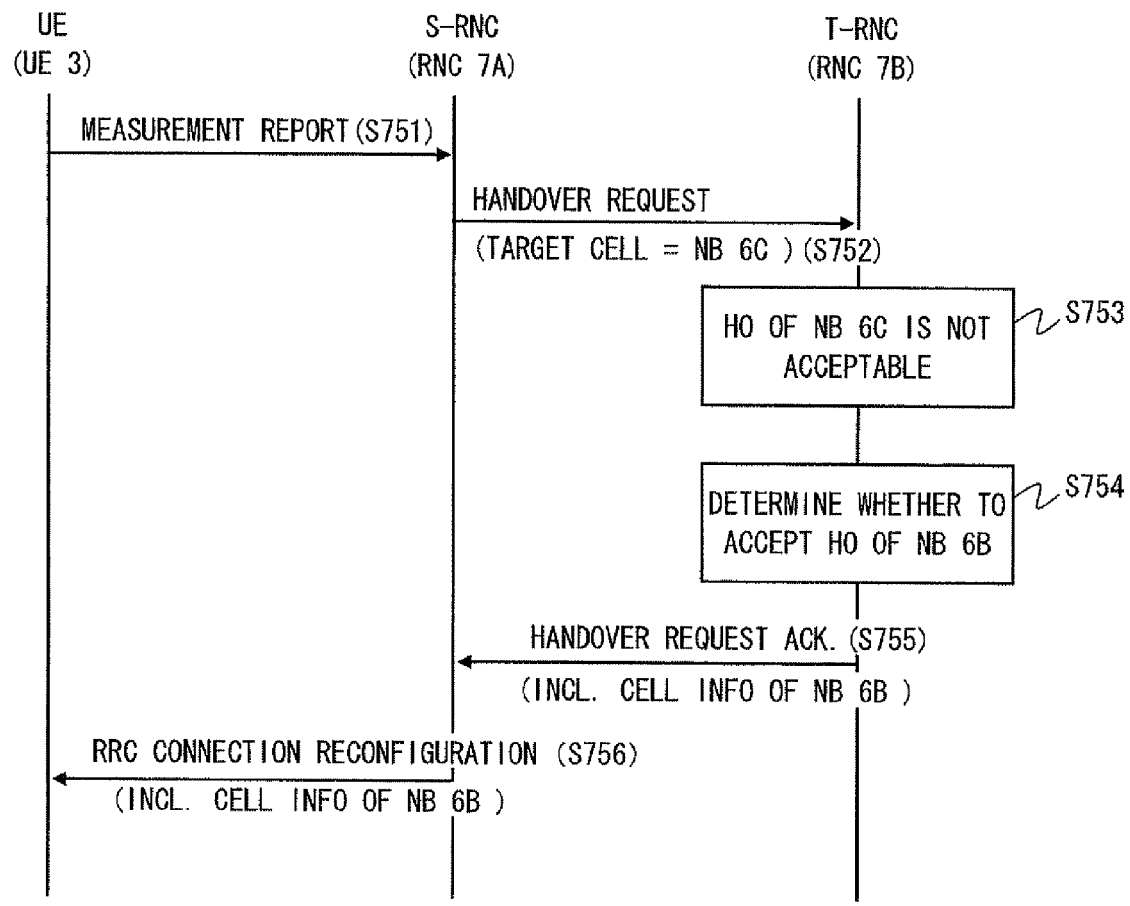
FIG. 26 is a sequence diagram showing an example of a handover procedure of a mobile station in the fifth modified example.

FIG. 26 shows a case where a handover acknowledge response including information on the base station 6B is returned in response to a handover request designating the base station 6C as a target cell. In step S751, the RNC 7A serving as the source RNC (S-RNC) receives a measurement report from the mobile station 3. The RNC 7A decides the base station 1C as the handover destination based on the measurement report, and transmits a handover request message (Handover Request) designating the base station 1C as the target cell to the RNC 7B serving as the target RNC (T-RNC) (step S752).

In step S753, the RNC 7B checks the use status of the source of the cell 41C (base station 6C) designated as the target cell. In the example of FIG. 26, the RNC 7B determines that the base station 6C cannot accept the handover request because the remaining resource of the base station 6C is insufficient (step S753). Then, the RNC 7B checks the use status of the resource of the cell 41B (base station 6B) which is an adjacent cell (step S754). The RNC 7B having determined that the cell 41B (base station 6B) can accept the handover generates an acknowledge response message including handover information on the base station 6B, and transmits the acknowledge response message to the RRC 7A (step S755). The RRC 7A having received the acknowledge response message transmits an RRC connection reconfiguration message to the mobile station 3 (step S756).

Also in this modified example, at least the transmission of the reject response message depending on the determination in step S653 is omitted.

Although no specific example is given, the second and third exemplary embodiments may also be applied to the Inter-RNC handover in the UTRAN network.

<Other Exemplary Embodiments>

The technical idea of "investigating handover possibilities of a plurality of cells in response to a single handover request and retuning a handover acknowledge response when at least one of the cells can accept the handover" can also be applied to a network including multi-hop connected RNs. In this case, the upper-level RN may mediate signaling related to a handover between the lower-level RN and the DeNB, and may investigate whether or not the lower-level RN can accept the handover. In other words, the upper-level RN may perform a handover control in the same manner as in the DeNB (base station 1B) described in the first to third exemplary embodiments of the invention.

In the above exemplary embodiments and modified examples, examples have been given in which an acknowledge response message including handover information on a single cell that can accept the handover is transmitted to a source control apparatus (S-eNB, S-RN, S-RNC, etc.) as a result of investigation as to whether or not a plurality of cells can accept the handover in response to a single handover request. However, at this time, if a plurality of cells that can accept the handover is present, the acknowledge response message including handover information on the plurality of cells may be transmitted to the source control apparatus. In this case, the source control apparatus may preferentially select a cell having a highest reception quality, which is indicated in the measurement report from the mobile station, as the handover destination, from among the plurality of cells that can accept the handover. Alternatively, the handover destination may be selected based on the cell type or the cell size.

The handover control processes of the source control apparatus and the target control apparatus, which have been described in the above exemplary embodiments and modified examples, can be implemented using a computer system including an ASIC (Application Specific Integrated Circuit), a DSP (Digital Signal Processor), an MPU (Micro Processing Unit), or a CPU (Central Processing Unit), or combinations thereof. Specifically, the computer system may be caused to execute programs including an instruction set related to the handover control procedures of the source control apparatus and the target control apparatus which have been described with reference to the sequence diagrams and flowcharts.

Note that these programs can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The programs may be provided to a computer using any type of transitory computer readable media. Examples of transitory computer readable media include electric signals, optical signals, and electromagnetic waves. Transitory computer readable media can provide the programs to a computer via a wired communication line, such as electric wires and optical fibers, or a radio communication line.

Moreover, the present invention is not limited to exemplary embodiments described above, but can be modified in various manners without departing from the scope of the present invention described above, as a matter of course.

This application is based upon and claims the benefit of priority from Japanese patent application No. 2009-186394, filed on Aug. 11, 2009, the disclosure of which is incorporated herein in its entirety by reference.

REFERENCE SIGNS LIST 1, 1A, 1B, 1C BASE STATION (eNB)
2, 2A, 2B, 2C RELAY STATION (RN)
3 MOBILE STATION (UE)
41, 41A, 41B, 41C CELL
42A, 42B, 42C CELL
5 CORE NETWORK (CN)
6A, 6B, 6C BASE STATION (NodeB)
7A, 7B RADIO NETWORK CONTROL APPARATUS (RNC)
11 Radio Communication Unit
12 TRANSMISSION DATA PROCESSING UNIT
13 RECEPTION DATA PROCESSING UNIT
14 COMMUNICATION UNIT
15 HANDOVER CONTROL UNIT
21 ACCESS LINK RADIO COMMUNICATION UNIT
22 TRANSMISSION DATA PROCESSING UNIT
23 RECEPTION DATA PROCESSING UNIT
24 BACKHAUL LINK RADIO COMMUNICATION UNIT
24 HANDOVER CONTROL UNIT
31 RADIO COMMUNICATION UNIT
32 RECEPTION DATA PROCESSING UNIT
33 TRANSMISSION DATA CONTROL UNIT
34 TRANSMISSION DATA PROCESSING UNIT
35 BUFFER UNIT
BL1-BL3 BACKHAUL LINK

The invention claimed is:

1. A handover control system comprising a first control apparatus and a second control apparatus, wherein
the first control apparatus is configured to determine a target cell based on a measurement report received from a mobile station and to transmit, to the second control apparatus, a first request message including first information designating the target cell as a handover destination of the mobile station, and
the second control apparatus is configured to transmit, to the first control apparatus, a first acknowledge response message including second information designating another cell that can accept a handover, wherein the another cell is different from the target cell and is not designated by the first request message.

2. The handover control system according to claim 1, wherein the second control apparatus is configured to investigate handover possibilities of a plurality of cells in response to receipt of the first request message.

3. The handover control system according to claim 2, wherein the second control apparatus transmits the first acknowledge response message to the first control apparatus when at least one of the plurality of cells can accept the handover of the mobile station.

4. The handover control system according to claim 2, wherein the second control apparatus is configured to select, from among the plurality of cells, a cell having a highest priority among cells that can accept the handover, and to transmit the first acknowledge response message including information on the selected cell as the another cell.

5. The handover control system according to claim 2, wherein the second control apparatus is configured to investigate whether or not candidate cells can accept the handover, in descending order of priorities of the plurality of cells.

6. The handover control system according to claim 2, further comprising a third control apparatus that manages a first cell included in the plurality of cells, wherein
upon receiving the first request message, the second control apparatus generates a new second request message, transmits the new second request message to the third control apparatus, and investigates a handover possibility of the first cell in response to receipt of a response message indicating whether the handover is acceptable or not from the third control apparatus.

7. The handover control system according to claim 6, wherein the second control apparatus is a base station that generates an upper-layer cell included in the plurality of cells, the first cell is a lower-layer cell that is disposed adjacent to the upper-layer cell and that has a cover area smaller than that of the upper-layer cell, and the third control apparatus is a relay station that is connected as a subordinate to the base station and that receives data transmitted to the lower-layer cell from a upper-level network via the base station.

8. The handover control system according to claim 2, wherein the second control apparatus investigates whether or not an adjacent cell neighboring the target cell can accept the handover, when the target cell cannot accept the handover request.

9. The handover control system according to claim 1, wherein the second control apparatus is configured to transmit a second request message, requesting a handover, to a plurality of cells, the plurality of cells including the target cell and the another cell, in response to receipt of the first request message 10. The handover control system according to claim 9, wherein the second control apparatus transmits the second request message to the another cell when the target cell cannot accept a handover request.

11. The handover control system according to claim 9, wherein, in response to transmitting the second request message, the second control apparatus receives a response message, from the another cell, indicating whether the handover to the another cell is acceptable or not.

12. The handover control system according to claim 1, wherein the first acknowledge response message includes information on a plurality of candidate cells that can accept a handover.

13. The handover control system according to claim 12, wherein the first control apparatus is configured to start the handover of the mobile station using one of the plurality of candidate cells indicated by the first acknowledge response message as a handover destination cell, in response to receipt of the first acknowledge response message.

14. The handover control system according to claim 13, wherein the first control apparatus is configured to decide the handover destination cell by determining a reception quality, at a location of the mobile station, of a signal from each of the plurality of candidate cells indicated by the first acknowledge response message.

15. The handover control system according to claim 1, wherein at least one of the first request message and the first acknowledge response message is transferred via a core network.

16. A handover control system comprising a first control apparatus and a second control apparatus, wherein the first control apparatus is configured to transmit a first request message including first information designating a plurality of candidate cells related to a handover destination of a mobile station, and the second control apparatus is configured to transmit, to the first control apparatus, a first acknowledge response message including second information on at least one cell, among the plurality of candidate cells, that can accept a handover, wherein the second control apparatus is configured to decide priorities of the plurality of candidate cells based on respective sizes of the plurality of candidate cells, and to preferentially incorporate information on a cell having a higher priority into the first acknowledge message.

17. The handover control system according to claim 16, wherein the second control apparatus is configured to investigate handover possibilities of the plurality of candidate cells in response to receipt of the first request message.

18. The handover control system according to claim 17, wherein the first request message further includes designation of priorities of the plurality of candidate cells, and the second control apparatus is configured to preferentially incorporate information on a cell, of the plurality of candidate cells, having a higher priority into the first acknowledge response message.

19. The handover control system according to claim 18, wherein the priorities are determined depending on respective reception qualities of radio signals from the plurality of candidate cells, measured by the mobile station.

20. The handover control system according to claim 16, wherein the second control apparatus is configured to decide priorities of the plurality of candidate cells based on respective load information of each of the plurality of candidate cells, and to preferentially incorporate information on a cell, of the plurality of candidate cells, having a higher priority into the first acknowledge response message.

21. A target control apparatus comprising control unit configured to receive, from a source control apparatus, a first request message including first information designating a target cell as a handover destination of a mobile station, and to transmit a first acknowledge response message including second information designating another cell that can accept a handover and that is different from the target cell, wherein the target cell is determined by the source control apparatus based on a measurement report received from the mobile station, and wherein the another cell is not designated by the first request message.

22. The target control apparatus according to claim 21, wherein the control unit is configured to investigate handover possibilities of a plurality of candidate cells in response to receipt of the first request message.

23. The target control apparatus according to claim 22, wherein the control unit transmits the first acknowledge response message when at least one of the plurality of candidate cells can accept the handover of the mobile station.

24. The target control apparatus according to claim 22, wherein the control unit is capable of selecting, from among the plurality of candidate cells, a cell having a highest priority among candidate cells that can accept a handover request, and transmitting the first acknowledge response message including information on the selected cell as the another cell.

25. The target control apparatus according to claim 22, wherein the control unit is capable of investigating whether or not candidate cells can accept the handover, in descending order of priorities of the plurality of candidate cells.

26. The target control apparatus according to claim 22, wherein upon receiving the first request message, the control unit generates a new second request message and transmits the new second request message to a first control station that manages a first cell included in the plurality of candidate cells, and investigates a handover possibility of the first cell in response to receipt of a response message indicating whether the handover is acceptable or not from the first control station.

27. The target control apparatus according to claim 26, wherein the target control apparatus is a base station that generates an upper-layer cell included in the plurality of cells, the first cell is a lower-layer cell disposed adjacent to the upper-layer cell and having a coverage area smaller than that of the upper-layer cell, and the first control station is a relay station that is connected as a subordinate to the base station and that receives data transmitted to the lower-layer cell from a upper-level network via the base station.

28. The target control apparatus according to claim 21, wherein the control unit is capable of transmitting a second request message requesting a handover to a plurality of candidate cells including the target cell and the another cell, in response to receipt of the first request message.

29. The target control apparatus according to claim 28, wherein the control unit transmits the second request message to the another cell when the target cell cannot accept a handover request.

30. The target control apparatus according to claim 28, wherein, in response to transmitting the second request message, the control unit receives a response message, from the another cell, indicating whether the handover to the another cell is acceptable or not.

31. The target control apparatus according to claim 21, wherein the first acknowledge response message includes information on a plurality of candidate cells that can accept a handover.

32. A handover control method comprising:
   receiving, from a source control apparatus, a first request message including first information designating a target cell as a handover designation of a mobile station, wherein the target cell is determined by the source control apparatus based on a measurement report received from the mobile station; and
   transmitting, to the source control apparatus, a first acknowledge response message including second information designating another cell that can accept a handover, wherein the another cell is different from the target cell and is not designated by the first request message.

33. A non-transitory computer readable medium storing a program for causing a computer to execute a handover control, the handover control comprising:
   receiving, from a source control apparatus, a first request message including first information designating a target cell as a handover designation of a mobile station, wherein the target cell is determined by the source control apparatus based on a measurement report received from the mobile station; and
   transmitting a first acknowledge response message including second information designating another cell that can accept a handover, wherein the another cell is different from the target cell and is not designated by the first request message.

34. A target control apparatus comprising:
   a control unit configured to receive, from a source control apparatus, a first request message including first information designating a plurality of candidate cells related to handover destination of a mobile station, and to transmit, to the source control apparatus, a first acknowledge response message including second information on at least one cell, of the plurality of candidate cells, that can accept a handover, wherein
   the control unit is configured to decide priorities of the plurality of candidate cells based on respective sizes of the plurality of candidate cells, and to preferentially incorporate information on a candidate cell having a higher priority into the first acknowledge response message.

* * * * *